US012517587B2

(12) United States Patent
Chauvette et al.

(10) Patent No.: US 12,517,587 B2
(45) Date of Patent: Jan. 6, 2026

(54) TRACKPAD SYSTEM WITH PIEZO-ELECTRIC ACTUATORS

(71) Applicant: Boréas Technologies Inc., Bromont (CA)

(72) Inventors: Guillaume Chauvette, Bromont (CA); Mathilde Charmeau, Bromont (CA); Jean-Martin Duhamel, Bromont (CA); Nicolas Gonthier, Bromont (CA)

(73) Assignee: Boréas Technologies Inc., Bromont (CA)

(*) Notice: Subject to any disclaimer, the term of this patent is extended or adjusted under 35 U.S.C. 154(b) by 0 days.

(21) Appl. No.: 18/723,668

(22) PCT Filed: Dec. 21, 2022

(86) PCT No.: PCT/CA2022/051874
§ 371 (c)(1),
(2) Date: Jun. 24, 2024

(87) PCT Pub. No.: WO2023/115209
PCT Pub. Date: Jun. 29, 2023

(65) Prior Publication Data
US 2025/0103138 A1    Mar. 27, 2025

Related U.S. Application Data

(60) Provisional application No. 63/293,388, filed on Dec. 23, 2021.

(51) Int. Cl.
G06F 3/01    (2006.01)
G06F 3/041   (2006.01)
G06F 3/044   (2006.01)

(52) U.S. Cl.
CPC ............ *G06F 3/016* (2013.01); *G06F 3/0414* (2013.01); *G06F 3/0416* (2013.01); *G06F 3/044* (2013.01)

(58) Field of Classification Search
CPC ...... G06F 3/016; G06F 3/0414; G06F 3/0416; G06F 3/044
See application file for complete search history.

(56) References Cited

U.S. PATENT DOCUMENTS

| | | | |
|---|---|---|---|
| 11,556,189 B1* | 1/2023 | Lee | G06F 3/016 |
| 2006/0192771 A1* | 8/2006 | Rosenberg | A63F 13/42 |
| | | | 345/173 |

(Continued)

FOREIGN PATENT DOCUMENTS

| | | |
|---|---|---|
| CA | 2688120 | 6/2010 |
| CA | 2742452 | 12/2011 |

OTHER PUBLICATIONS

International Search Report for corresponding PCT Application No. PCT/CA2022/051874 issued Mar. 22, 2023.

(Continued)

*Primary Examiner* — Ryan A Lubit
(74) *Attorney, Agent, or Firm* — Stratford Group Ltd.

(57) ABSTRACT

A trackpad assembly provides a better uniformity of the user input and the retroactive tactile feedback by providing a plurality of piezo-electric actuators mounted on one side of a PCB configured to generate electrical signals in response to a force application by a user on the top touch surface on another side of the PCB. A control circuit is configured to receive the electrical signals from the plurality of piezo-electric actuators, determine the position of the force application on the top touch surface and generate haptic response signals, which may be targeted based on the position of the force application.

21 Claims, 29 Drawing Sheets

(56) References Cited

U.S. PATENT DOCUMENTS

| | | | |
|---|---|---|---|
| 2008/0122315 A1 | 5/2008 | Maruyama et al. | |
| 2009/0245555 A1* | 10/2009 | Parker | H04R 25/606 |
| | | | 381/326 |
| 2010/0053087 A1* | 3/2010 | Dai | H03K 17/9622 |
| | | | 178/18.06 |
| 2010/0156843 A1* | 6/2010 | Paleczny | G06F 3/041 |
| | | | 345/174 |
| 2012/0038562 A1 | 2/2012 | Varela et al. | |
| 2012/0075198 A1 | 3/2012 | Sulem et al. | |
| 2014/0082490 A1* | 3/2014 | Jung | G06F 3/04886 |
| | | | 715/702 |
| 2019/0302948 A1* | 10/2019 | Laitinen | H10N 30/88 |
| 2022/0100308 A1* | 3/2022 | Du | G06F 3/0433 |
| 2022/0123605 A1* | 4/2022 | Kim | G06F 1/1632 |
| 2023/0126612 A1* | 4/2023 | Gajiwala | G06F 3/03547 |
| | | | 340/407.2 |

OTHER PUBLICATIONS

Written Opinion of the ISA for corresponding PCT Application No. PCT/CA2022/051874 issued Mar. 22, 2023.
Extended European Search Report for corresponding EP Application No. 22908966.9 issued Oct. 29, 2025.

* cited by examiner

TRACKPAD SYSTEM WITH PIEZO-ELECTRIC ACTUATORS

TECHNICAL FIELD

The present disclosure relates to a trackpad system, and in particular to a trackpad system using piezo-electric actuators for haptic feedback.

BACKGROUND

Trackpads found in most laptops lack the ability to give retroactive feedback to confirm that a simple action, such as a "mouse click", has been performed.

Some of the laptop manufacturers have introduced track pads with a hinge on their top edge adjacent to the keyboard, and place a mechanical dome switch underneath the input device to provide a retroactive tactile feedback. Those devices may have a non-uniformity of the input force required to produce a "mouse click." The strength of the tactile feedback may also be greatly influenced by the location where the "user input" pressure is applied, e.g. little to no feedback near the hinge. Finally, those devices are limited to the tactile feedback created by a mechanical switch, e.g. the tactile feedback is the same if the computer is turned on or off.

An object of the present disclosure is to provide a better uniformity of the user input and the retroactive tactile feedback.

SUMMARY

Accordingly, a first apparatus includes a trackpad system comprising:
- a printed circuit board (PCB) including a plurality of electronic components;
- a top touch surface mounted on a first side of the PCB;
- a plurality of piezo-electric actuators mounted on a second side of the PCB configured to generate electrical signals in response to a force application by a user on the top touch surface, and to provide a haptic response to the user in response to haptic response signals;
- a plurality of shims, at least one of the plurality of shims mounted on each of the plurality of piezo-electric actuators configured to enable deformation of each of the plurality of piezo-electric actuators; and
- a control circuit configured to receive the electrical signals from the plurality of piezo-electric actuators, and configured to generate the haptic response signals.

According to any of the aforementioned embodiments, the control circuit may comprise:
- a controller processor; and
- a non-transitory memory including instructions, which when executed by the controller processor configures the controller processor to:
  - determine a location of a user's input on the top touch surface; and
  - target a haptic response signal to a selected one or more of the piezo-electric actuators.

According to any of the aforementioned embodiments, the controller processor may exclude one or more others of the piezo-electric actuators, based on the location of the user's input.

According to any of the aforementioned embodiments, the controller processor may be configured to determine the location of the force application by interpolation based on input voltage signals from the plurality of piezo-electric actuators.

According to any of the aforementioned embodiments, the controller processor may be configured to determine a location of the force application based on input signals from capacitive touch sensors.

According to any of the aforementioned embodiments, the controller processor may be configured to modify a strength of the haptic response signal to one or more of the plurality of piezo-electric actuators to provide substantial uniformity of the haptic response across the top touch surface.

According to any of the aforementioned embodiments, the controller processor may be configured to utilize a input map of sensitivity variability and an output map of sensitivity variability stored in the non-transitory memory to compensate for non-uniformity of the piezo-electric actuators.

According to any of the aforementioned embodiments, the controller processor may be configured to produce a different haptic response signal to one or more of the plurality of piezo-electric actuators to provide a difference in haptic feedback across the top touch surface.

According to any of the aforementioned embodiments, the controller processor may be configured to produce a different haptic feedback to one or more of the plurality of piezo-electric actuators based on a magnitude of the force application of the user.

According to any of the aforementioned embodiments, each trackpad may be divided into a plurality of zones, each zone corresponding to two or more of the plurality of piezo-electric actuators; and wherein the controller processor is configured to produce a continuous haptic feedback to one or more of the plurality of zones to simulate a scrolling or dragging effects.

According to any of the aforementioned embodiments, the system may further comprise a plurality of resilient members, one of the plurality of resilient members mounted on each one of the plurality of piezo-electric actuators, configured to enable the plurality of piezo-electric actuators to deform during the force application by the user or a haptic response to the user.

According to any of the aforementioned embodiments, each one of the plurality of piezo-electric actuators may have a quadrilateral shape; and wherein each one of the plurality of resilient members comprises a cantilevered arm.

According to any of the aforementioned embodiments, each one of the plurality of resilient members may comprise a pair of cantilevered arms, outer free ends of each of the pair of cantilevered arms connected to ends of a respective one of the plurality of piezo-electric actuators.

According to any of the aforementioned embodiments, each one of the plurality of piezo-electric actuators may be at an acute angle to an edge of the top touch surface.

According to any of the aforementioned embodiments, the system may further comprise a base configured to support the plurality of piezo-electric actuators; wherein each cantilevered arm is integral with the base.

According to any of the aforementioned embodiments, each one of the plurality of piezo-electric actuators may comprise a circular disk; and wherein each one of the plurality of resilient members comprises a circular substrate with a diameter larger than the circular disk.

According to any of the aforementioned embodiments, the system may further comprise a base configured to support the plurality of piezo-electric actuators mounted on each respective shim, whereby the base is configured to form a hard stop for the deformation of each of the plurality of piezo-electric actuators.

According to any of the aforementioned embodiments, each respective shim may be integral with the base.

According to any of the aforementioned embodiments, each respective shim may comprise adhesive defining at least a partial perimeter of a corresponding one of the plurality of piezo-electric actuators.

According to any of the aforementioned embodiments, each respective shim may comprises an electrical connector mounted on the PCB configured to electrical connect each the plurality of piezo-electric actuators to the PCB.

According to any of the aforementioned embodiments, each one of the plurality of piezo-electric actuators may comprise a pair of superposed circular disks; and wherein each respective shim is mounted between each pair of superposed circular disks.

According to any of the aforementioned embodiments, all of the plurality of shims may comprise a single component.

BRIEF DESCRIPTION OF THE DRAWINGS

Some example embodiments will be described in greater detail with reference to the accompanying drawings, wherein.

DETAILED DESCRIPTION

Figure 1:
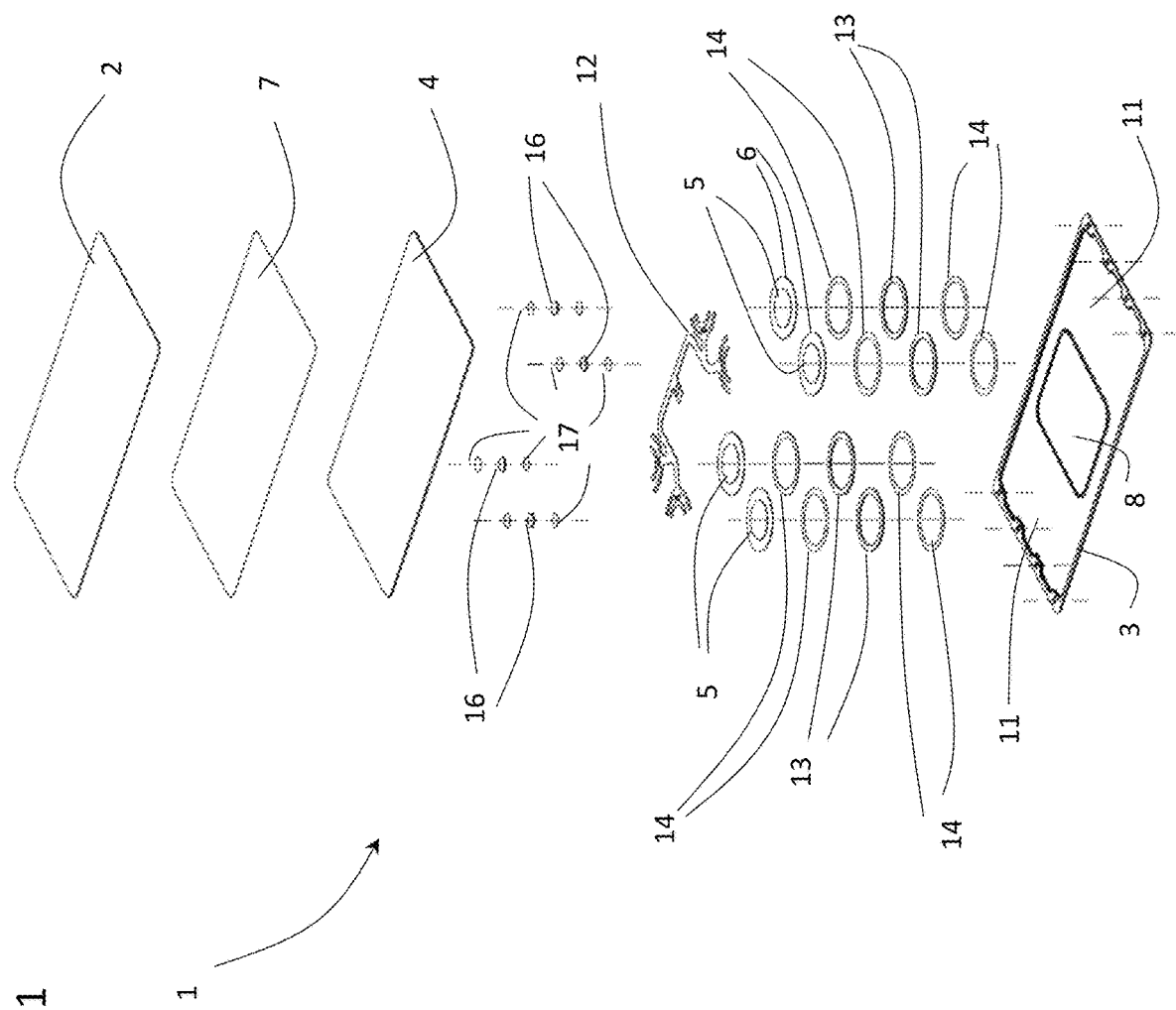
FIG. 1 is an exploded view of a trackpad assembly in accordance with an example.

While the present teachings are described in conjunction with various embodiments and examples, it is not intended that the present teachings be limited to such embodiments. On the contrary, the present teachings encompass various alternatives and equivalents, as will be appreciated by those of skill in the art.

The track pad designs proposed in the present disclosure enable a better uniformity of the user input and retroactive tactile feedback. By using the information coming from capacitive touch sensors in the trackpad and/or by interpolating signals from the piezo-electrical actuators, it is possible to precisely locate the user input and use a correction map to compensate for any variation induced by the system.

By having the ability to detect pressure levels and location of the user input, the proposed designs allow for advanced/enriched/contextual user inputs, e.g. variation of the pressure applied on the trackpad, whereby drawing a line could change the width of the line in the drawing application, or applying a light pressure on the trackpad over an icon could pop on a description of the functionality on the display then pressing with more force could confirm the use of that functionality.

The proposed designs allow for haptic feedback to a user using a trackpad to be enriched by providing different haptic waveforms to inform the user of a specific condition, e.g. the haptic feedback may be different when an action performed is accepted versus denied. Different user interaction with the trackpad may be enriched by different haptic feedback, e.g. continuous scrolling effect waveforms may be produced while user drags a finger on the trackpad. The haptic feedback could also be contextual and dependent on the application used. Regions of the trackpad could have a specific functionality that is dependent on the application used, e.g. video editing application could use the top left corner of the trackpad to rewind the video while top right corner is used to forward the video (contextual virtual buttons). When those actions are performed, the haptic feedback signal may be different from the haptic signal for the remaining region/surface of the track pad. Pressure variation on specific buttons could also influence the speed at which the video is rewound or forwarded.

With reference to FIG. 1, a trackpad assembly 1 includes a top touch surface 2, comprised of one or more of glass, composite, and mylar or other suitable material, and a base 3 with a printed circuit board (PCB) 4, and a plurality of piezo-electric actuators 5 sandwiched therebetween. The base 3 can be a separate bracket configured for mounting on a computer 21 or any substrate, which is an existing part of the computer 21. The PCB 4 may also include capacitive touch sensors on an upper surface thereof, as is well known in the art. The piezo-electric actuators 5 may be a round disk mounted on a round support member 6, which has a diameter larger than the diameter of the piezo-electric actuators 5. The support member 6 may be comprised of a resilient member, e.g. a thin metal disk substrate on which the thin piezo-electric actuator 5 bonded, whereby pushing in the center of the piezo-electric actuator 5 while holding the circumference of the support member 6 will bend the piezo-electric actuator 5 and produce a charge, e.g. voltage signal, representing a user input detection. The top touch surface 2 may be fixed to the PCB with an adhesive layer 7. The base 3 may include an opening 8 for receiving electronic components 9 extending from the PCB 4, and mounting platforms 11 on either side of the opening 8 for supporting the piezo-electric actuators 5. The piezo-electric actuators 5 may be arranged in a 2×2 array, e.g. two on each side of the opening 8 corresponding to the four corners of the trackpad assembly 1 and the top touch surface 2. The electronic components 9 may include a control circuit configured to receive the electrical signals from the plurality of piezo-electric actuators in response to a force application by a user, and to generate haptic response signals to be sent back to selected ones of the piezo-electric actuators, e.g. based on the position of the force application. The control circuit may comprise a controller processor executing computer software instructions stored on a non-transitory memory.

The piezo-electric actuators 5 may be electrically connected to the PCB 4 with a suitable electrical connector, such as a flexible printed circuit or flexible FPC 12. Pushing on the top touch surface 2 of the trackpad assembly 1, e.g. above a threshold force level, may translate into a deformation of the piezo-electric actuators 5 and into a generation of an electric signal from each piezo-electric actuator 5 that may be detected by the electronic components 9. Sending haptic response signals, e.g. voltage signals, to the piezo-electric actuators 5 from the electronic components 9 may lead to a deformation of the piezo-electric actuators 5, which may lead to the displacement of the top touch surface 2 and thereby produce a tactile feedback to the user. Having a plurality of piezo-electric actuators 5 in the system 1 may enable the position of the force applied to the top touch surface 2 to be interpolated from the plurality of electric signals, i.e. from each of the piezo-electric actuators 5, and enable the targeting of a specific region of tactile feedback, i.e. transmitting haptic feedback electrical signals to one or more specific piezo-electric actuators 5, e.g. palm inhibition, but not to others.

On top of the base 3, shims 13, e.g. arcuate, annular or "O" shaped, may be bonded between the base 3 and to the piezo-electric actuators 5. In some embodiments the shims 13 may comprise just an adhesive 14, e.g. forming at least a partial outline around the perimeter of the corresponding piezo-electric actuator 5. In other embodiments, the shims 13 comprise a separate shim 13, e.g. plastic or metal, and the adhesive 14. The annular shims 13 may extend partially or fully around the perimeter of the piezo-electric actuators 5 or the support member 6, i.e. the annular shims 13 may have a diameter substantially the same as the piezo-electric actuators 5 or the support member 6 and larger than the diameter of the piezo electric actuator 5. The thickness of the shims 13 and the adhesive 14, e.g. 0.1 mm to 0.25 mm, may act to define a limit of deformation of the piezo-electric actuators 5 before a hard stop provided by the base 3 to limit the amount of stress that may be applied to the piezo-electric actuators 5 by limiting the bending of the piezo-electric actuators 5 to the thickness of the shims 13, e.g. adhesive 14 or separate shim 13+the adhesives 14. Once the piezo-electric actuators 5 bottom-out to the base 3, any extra force does not apply extra bending strength to the piezo-electric actuator 5. Sending a haptic response, e.g. voltage, signal to the piezo-electric actuator 5 may bend the piezo-electric actuator 5 and produce a deformation, e.g. a displacement of the top touch surface 2 and a haptic feedback to the user.

Plungers 16 may be provided bonded to and extending outwardly from the center of each of the piezo-electric actuators 5 with an adhesive 17 to concentrate the force coming from user input to the center of the piezo-electric actuators 5. The plungers 16 may also be bonded to the PCB 4 by an adhesive 17.

Figure 2:
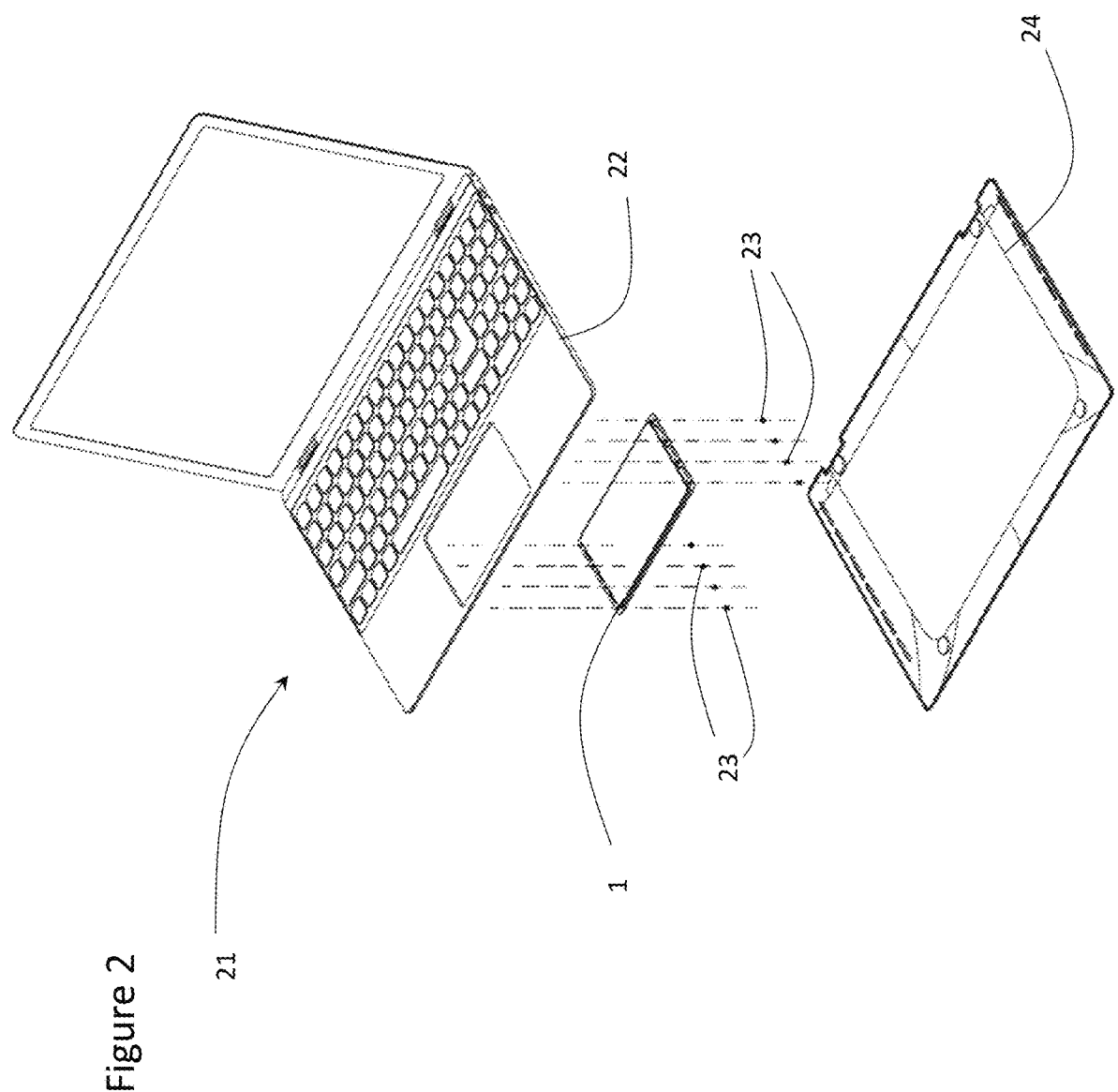
FIG. 2 is a partially exploded view of the trackpad assembly in accordance with FIG. 1 in a laptop computer.

With reference to FIG. 2, the trackpad assembly 1 may be integrated into a laptop computer 21 by insertion of the trackpad assembly 1 from the bottom-up and fastened to the upper casing 22 (C shell) of the laptop computer 21 using any suitable fasteners 23, e.g. threaded fasteners extending from below and through the trackpad assembly 1 and into the upper casing 22. The lower casing 24 (D shell) may then be connected to the upper casing 22.

Figure 3:
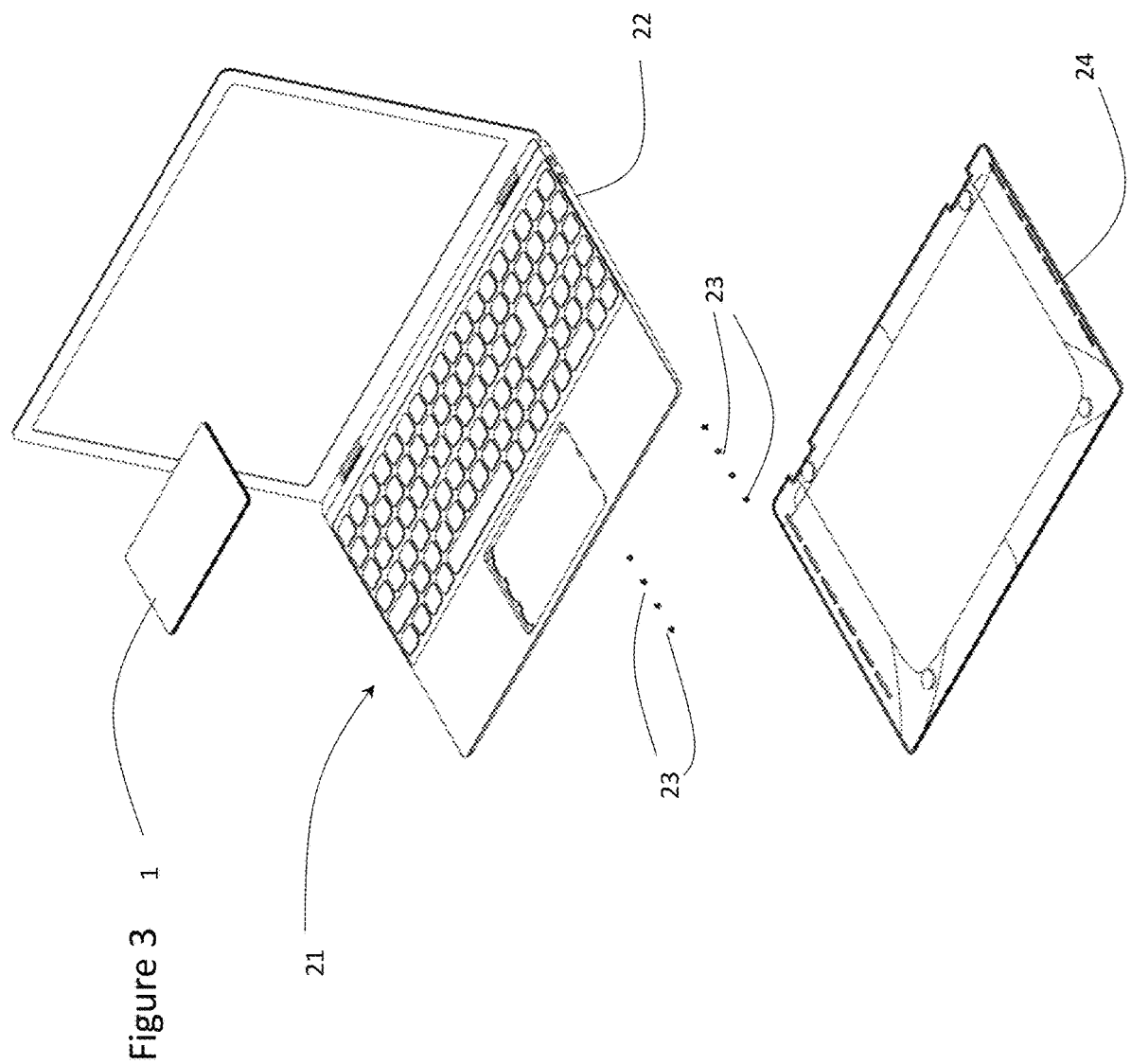
FIG. 3 is a partially exploded view of the trackpad assembly in accordance with FIG. 1 in a laptop computer.

With reference to FIG. 3, the trackpad assembly 1 may be integrated into a laptop computer 21 by insertion of the trackpad assembly 1 from top-down and fastened to the upper casing 22 (C shell) of the laptop computer 21. Suitable fasteners, e.g. thread fasteners (screws or bolts) may be used to fasten the trackpad assembly 1 in place. The thread fasteners 23 may extend from below and through the upper casing 22 into the trackpad assembly 1. Threaded inserts may be provided on the base 3 for receiving the threaded fasteners. However, any suitable fastening method may be used, e.g. wedge, adhesives, to connect the trackpad assembly 1 to the laptop computer 21.

Figure 4:
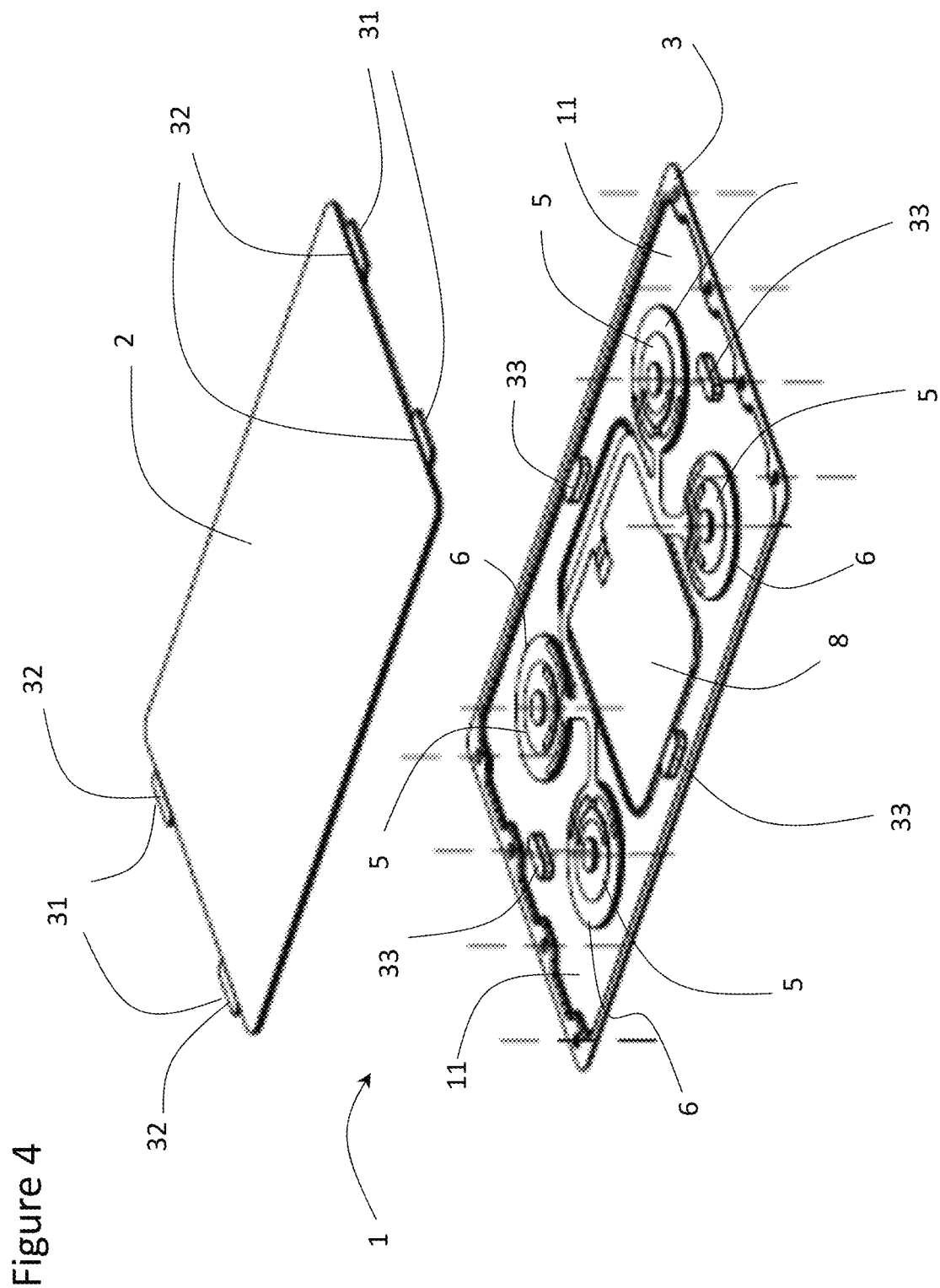
FIG. 4 is a partially exploded view of the trackpad assembly in accordance with FIG. 1.
Figure 5:
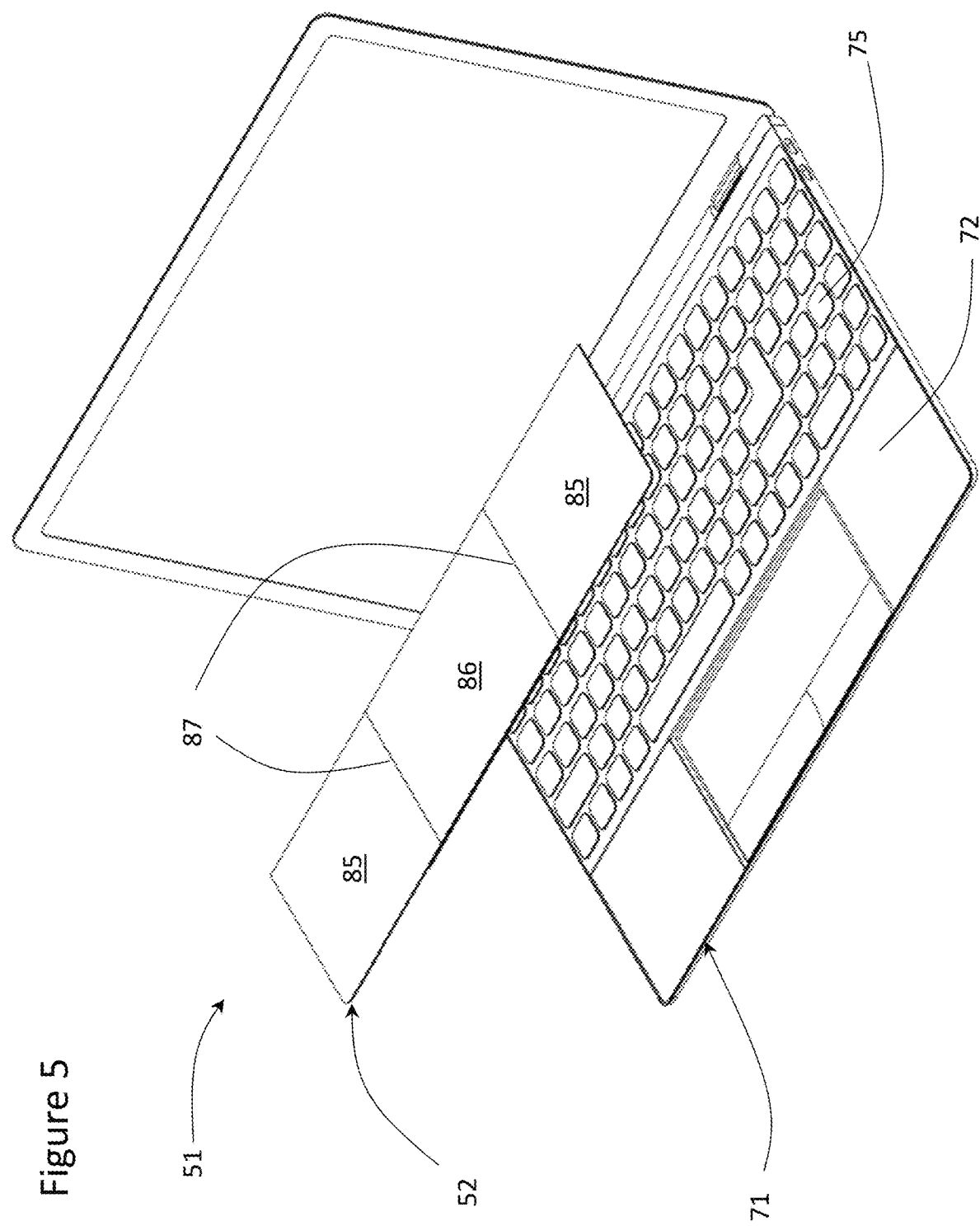
FIG. 5 is a partially exploded view of the trackpad assembly in accordance with another example in a laptop computer.
Figure 6:
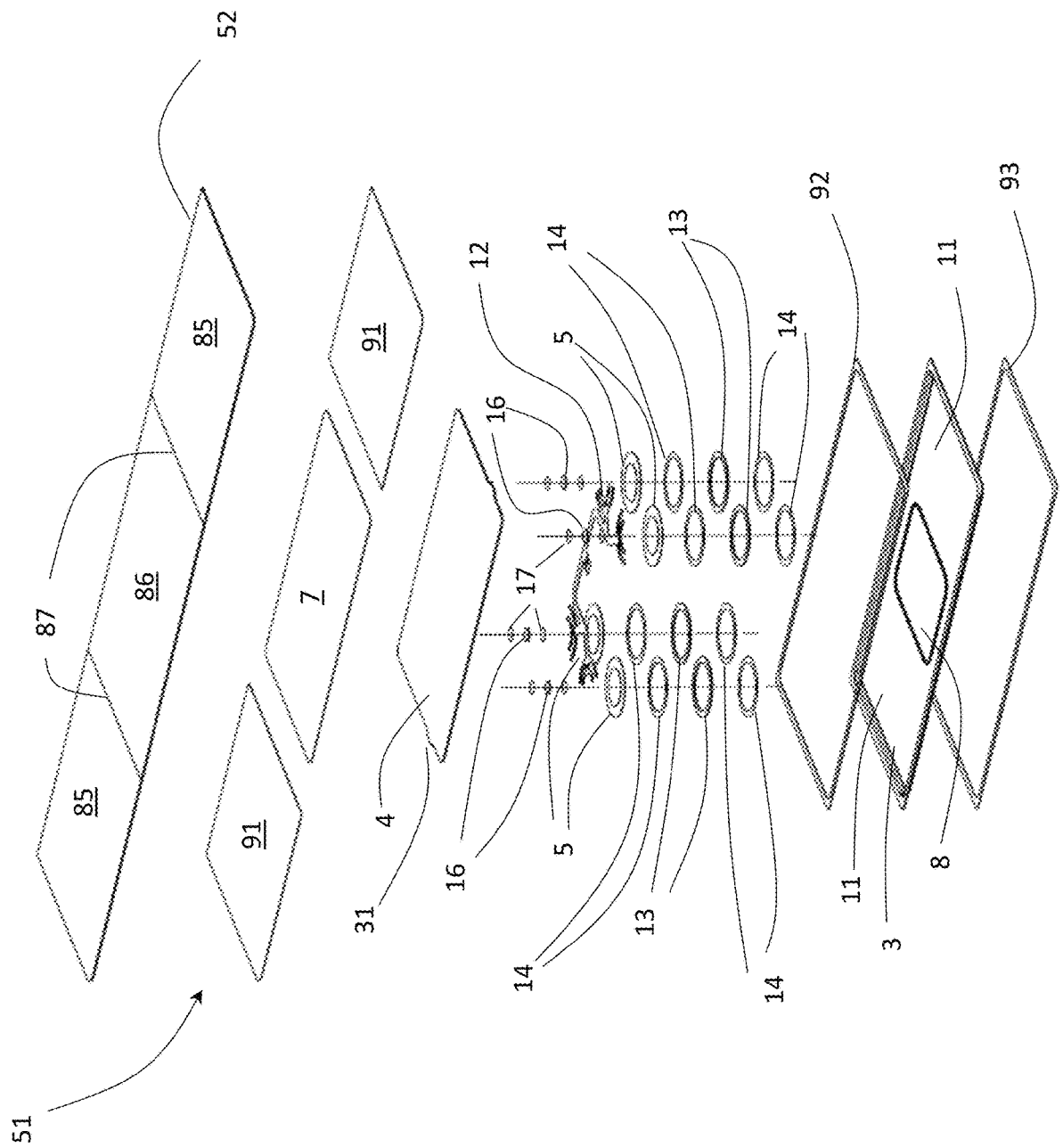
FIG. 6 is an exploded view of the trackpad assembly in accordance with FIG. 5.
Figure 7:
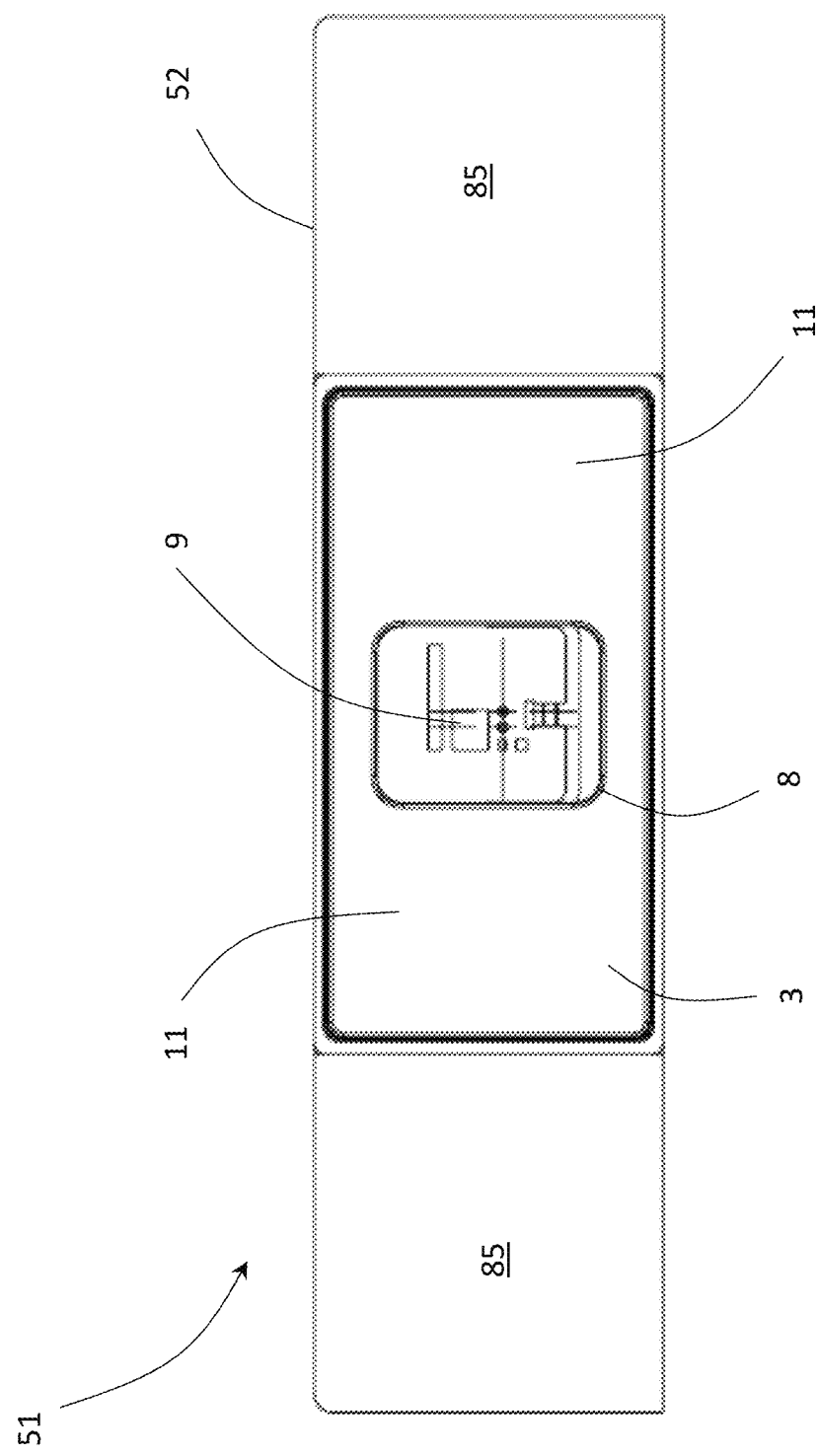
FIG. 7 is a top view of the trackpad assembly in accordance with FIG. 5.
Figure 8:
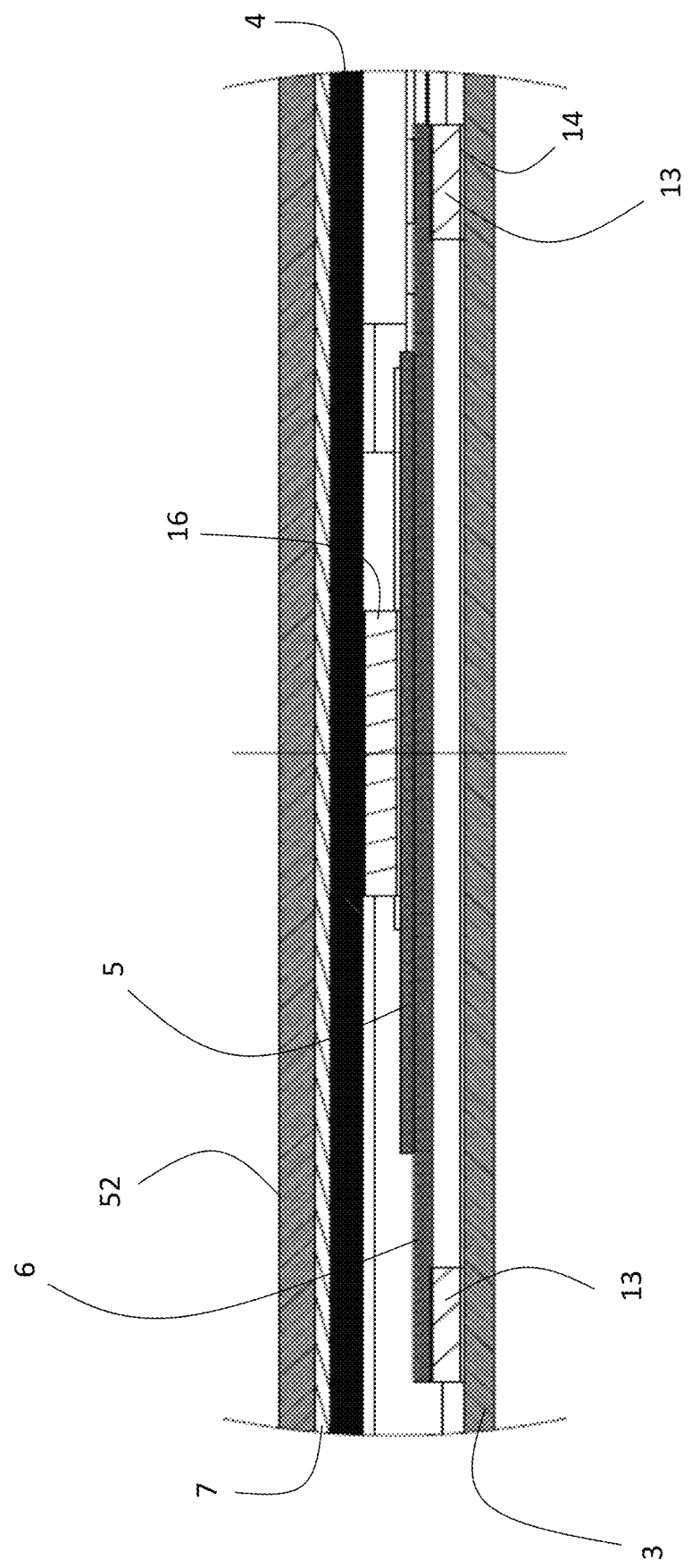
FIG. 8 is a cross-sectional view of the trackpad assembly in accordance with FIG. 5.

In some previous designs, the only elements that may prevent the top touch surface 2 and the PCB 4 from moving upward from the laptop computer 21 are the adhesives 7, 14 and 17. With reference to FIG. 4, in order to produce a more durable assembly, tabs 31 may be provided, e.g. extending from the sides of the PCB 4 that abut against the upper casing 22 (C Shell) of the laptop computer 21, thereby limiting the upward movement. Compliant or resilient elements 32 may be mounted on the tabs 31 between the PCB 4 and the upper casing 22 (C Shell) to allow for some displacement to occur and/or apply preload to the piezo-electric actuators 5. Alternatively, or in conjunction with the tabs 31, additional compliant or resilient elements 33 may be provided between the base 3 and the PCB 4 to maintain the PCB 4 and the top touch surface 2 at their respective locations. The resilient and holding features 31-33 may be applied to some or all of the trackpad assemblies therein discussed.

With reference to FIG. 5-8, another exemplary trackpad assembly 51 includes a top touch surface 52, which may extend substantially up to the entire width of the laptop computer 71, and from a front edge of the laptop computer 71 to the keyboard 75, creating a "seamless" surface between the palm rest 85 and top touch surface "regions" 86. Even though the top touch surface 52 is "seamless," it may be desirable to have tactile features 87, e.g. etched marks in the glass, in the top touch surface 52 to delimit the location on the track pad region 86 from the palm rest 85. As above, the trackpad system 51 may be inserted from top-down and fastened to the upper casing 72 (C shell) of the laptop computer 71.

The following seamless design will be used to demonstrate many design variations, but all those designs may also apply to the aforementioned track pad integration of trackpad assembly 1, when possible.

With the seamless design, the top touch surface 52 may be bonded to the upper casing 72 (C Shell) of the laptop computer 71 with an adhesive 91 in addition to the adhesive 7, which connects the touchpad assembly 51 to the PCB 4. The top touch surface 52 may need to deflect in order to transmit the user input force to the piezo-electric actuators 5, and to enable the haptic feedback to be transmitted from the piezo-electric actuators 5 to the user.

As in the aforementioned examples, there may be four piezo-electric actuators 5 between the PCB 4 and the base 3, and there may be similar flexible FPC 12, shims 13, plungers 16 and adhesives 14 and 17. However, the base 3 may be bonded to the top touch surface 52 with an adhesive 92, and bonded to the upper casing 72 (C Shell) with an adhesive 93.

Figure 9:
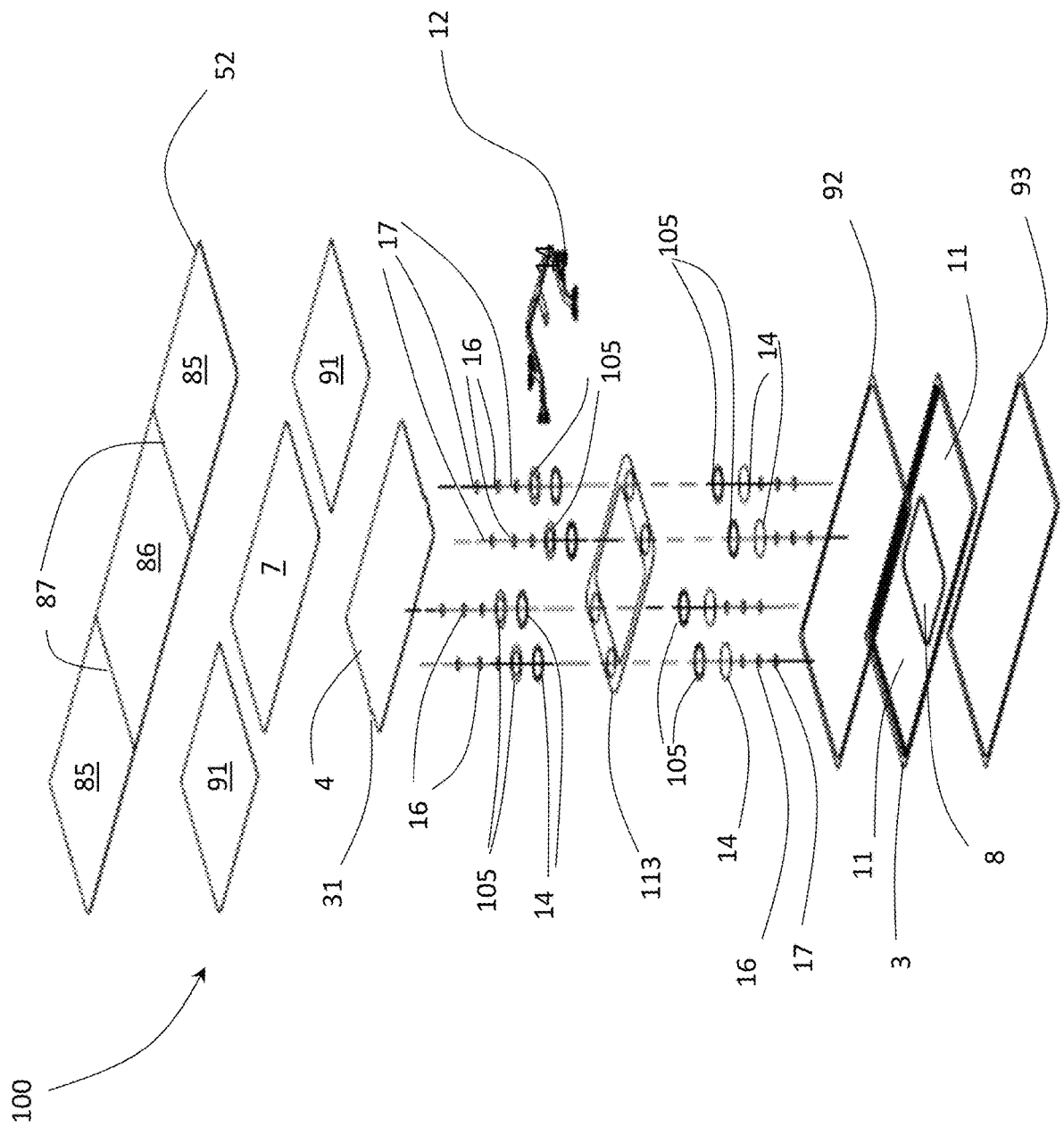
FIG. 9 is an exploded view of a trackpad assembly in accordance with another example.
Figure 10:
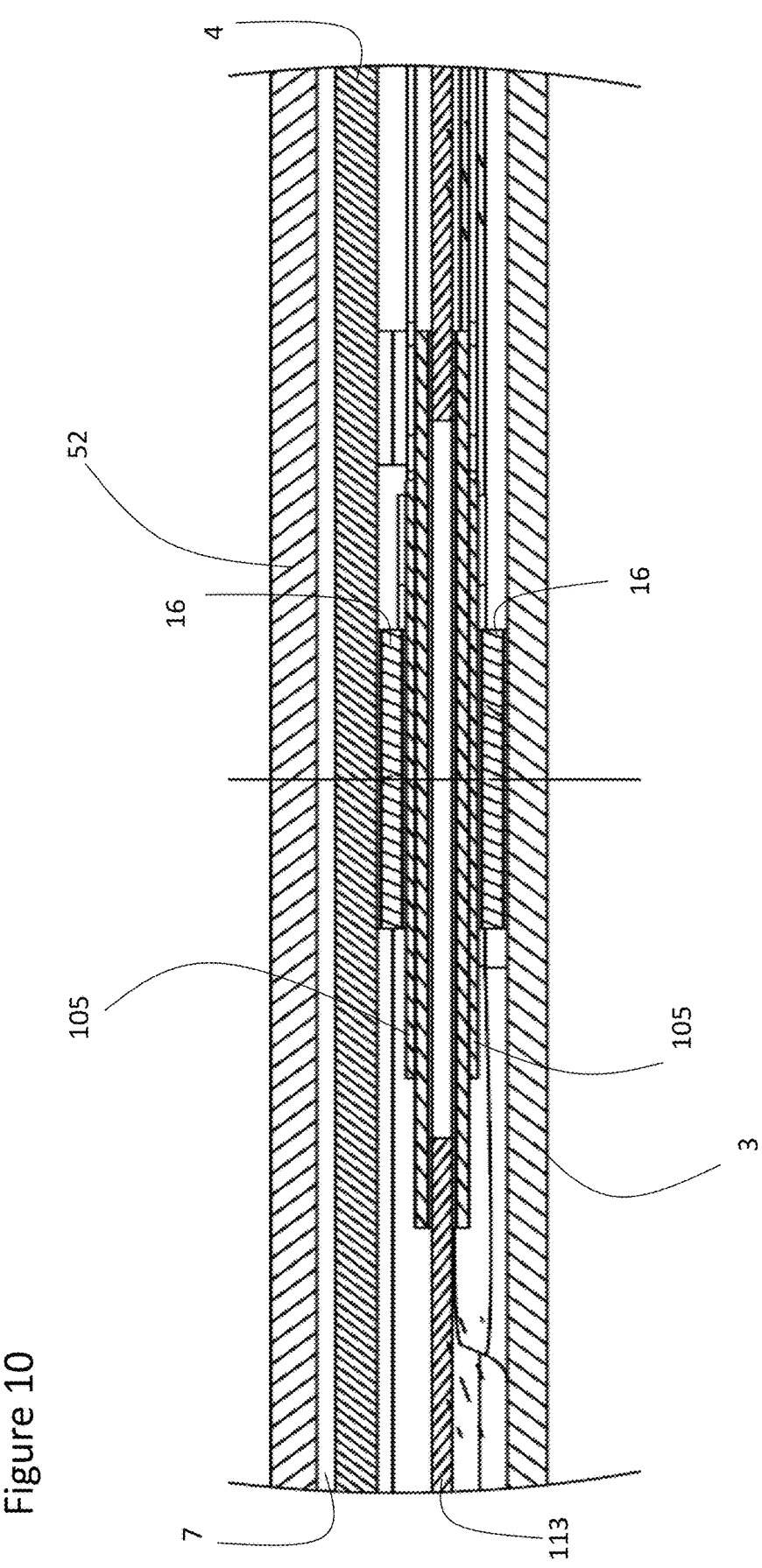
FIG. 10 is a cross-sectional view of the trackpad assembly in accordance with FIG. 9.

With reference to FIGS. 9 and 10, using only four piezo-electric actuators 5 to actuate the trackpad assembly 51 may require large or multi-layer piezo-electric elements 5. An alternative solution that may be less expensive to produce is to combine smaller and/or single layer piezo-electric actuators 105. The following example couple a pair of small piezo-electric actuators 105 in series, e.g. superposed, to replace a large piezo-electric actuator disk. A shim 113 between the piezo-electric actuators 105 may have a specific thickness, e.g. 0.1 mm to 0.25 mm, to limit the deformation of the piezo-electric actuators 105, i.e. limiting the amount of stress applied to them. Once the piezo-electric actuators 105 bottom-out to the other piezo-electric actuators 105 with which it is paired, any extra force does not apply extra bending strength to the piezo-electric actuator 105. The shims 113 may be comprised of an adhesive or adhesive and a single component with a plurality of openings, each opening having a perimeter connected to outer perimeter of the piezo-electric actuators 105 enabling the piezo-electric actuators 105 to extend therein during force application or haptic response. The shims 113 may also include a larger opening enabling the electronic components 9 to extend therethrough. The FPC 12 may be used to serve as the shim 113 by offering an adequate gap between the piezo-electric actuator pairs 105 and by electrically connecting them.

The plungers 16 may be provided bonded to and extending outwardly from the center of each of the piezo-electric actuators 105 with an adhesive 17 to concentrate the force coming from user input to the center of the piezo-electric actuators 105. The plungers 16 may also be bonded to the PCB 4 and to the base 3 by an adhesive 17.

Figure 11:
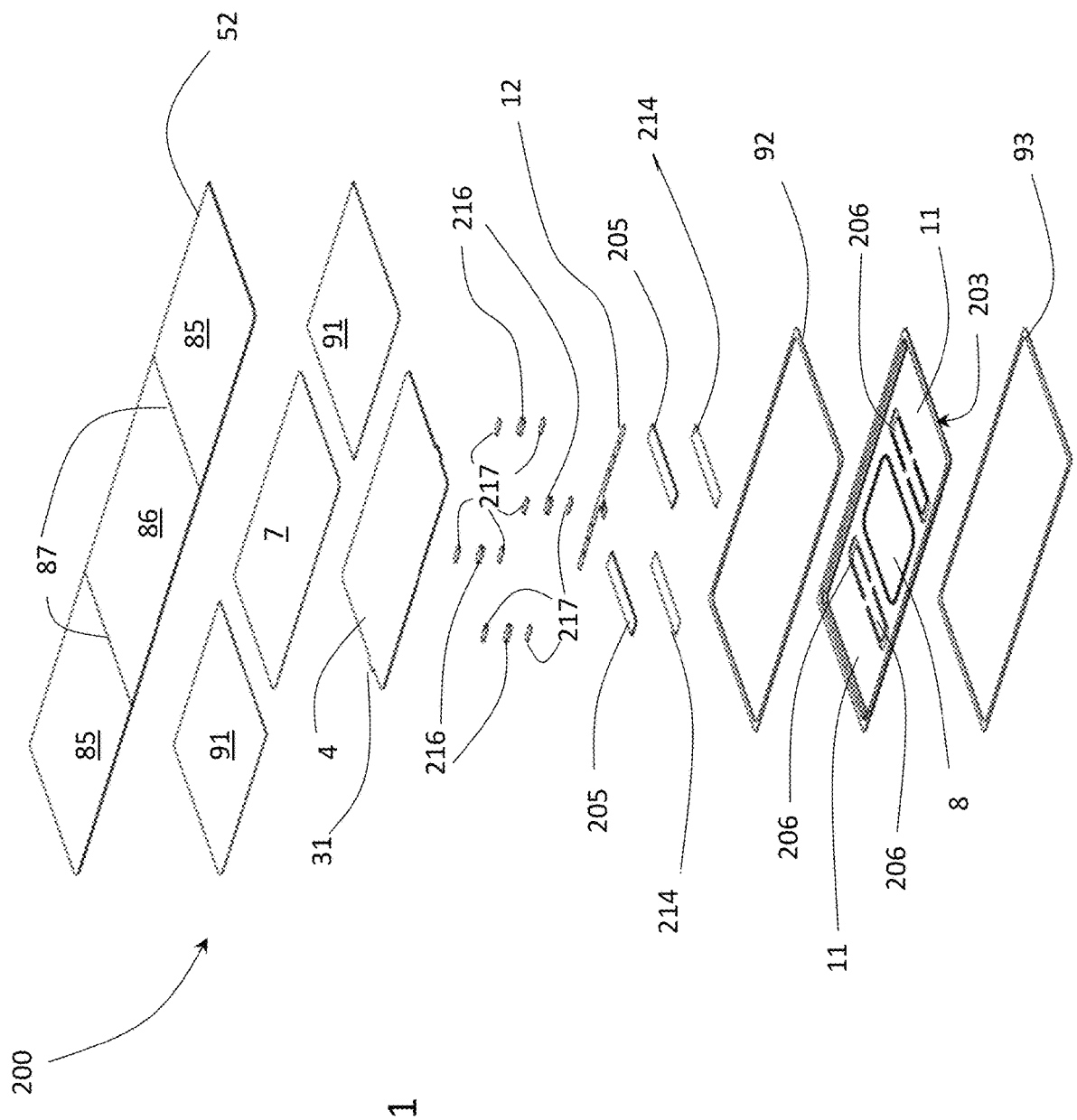
FIG. 11 is an exploded view of a trackpad assembly in accordance with another example.
Figure 12A:
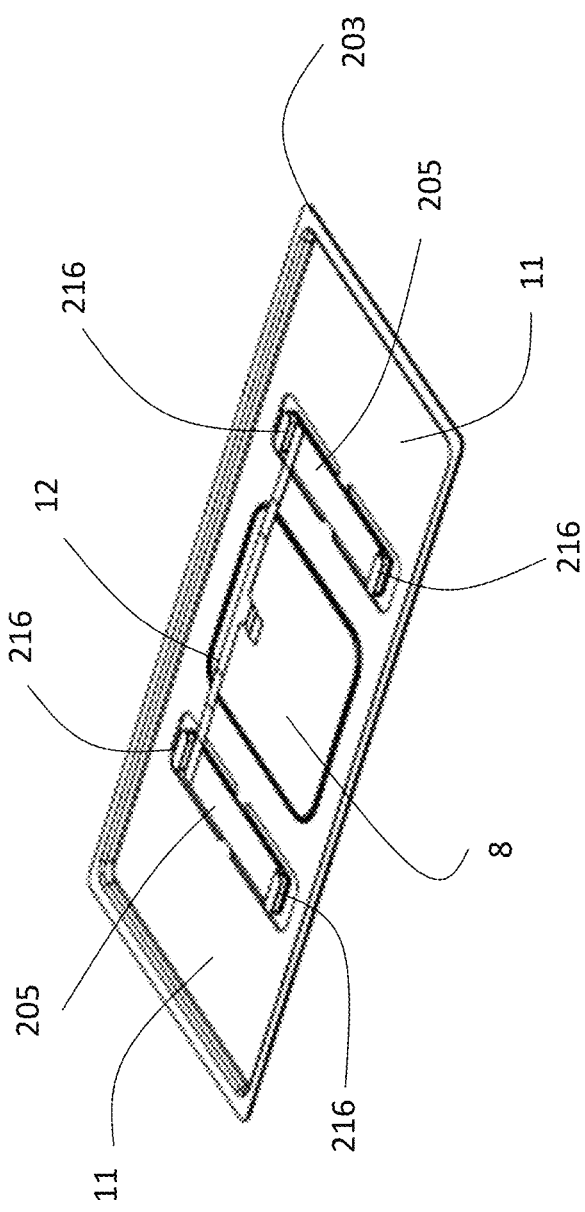
FIG. 12A is an isometric view of the trackpad assembly in accordance with FIG. 11.
Figure 12B:
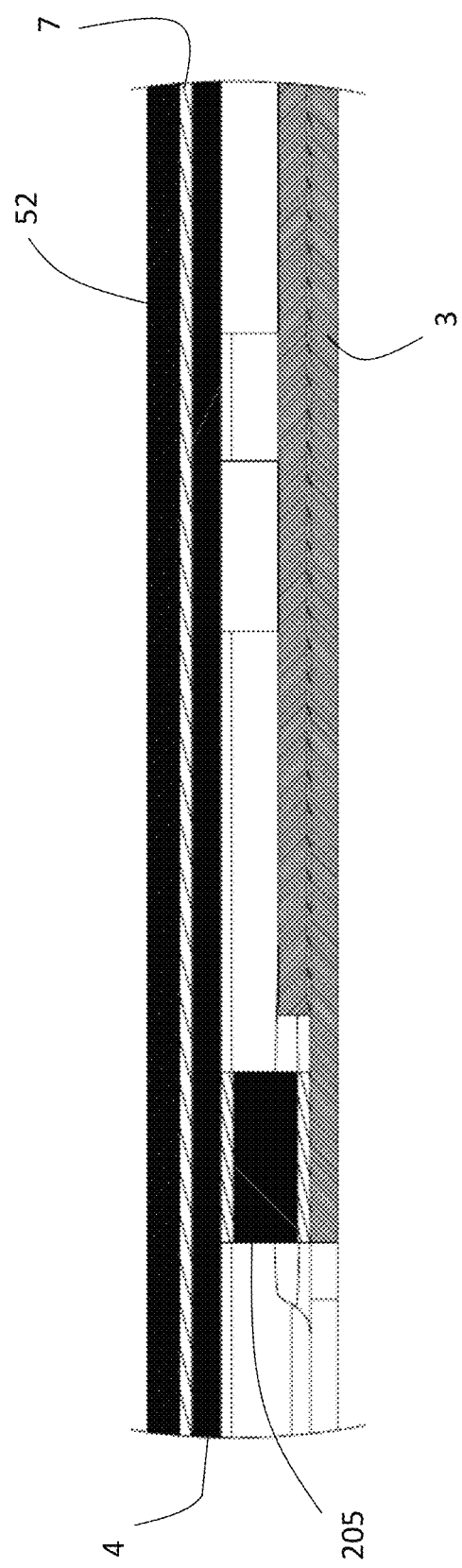
FIG. 12B is a cross-sectional view of the trackpad assembly in accordance with FIG. 11.

With reference to FIGS. 11, 12A and 12B, another option is to provide a trackpad assembly 200 including elongated and/or quadrilateral, e.g. rectangular, piezo-electric actuators 205 instead of the round piezo-electric actuators 5 and 105. The illustrated example includes two rectangular piezo-electric actuators 205 extending parallel to each side on a base 203, e.g. bracket or substrate, one on each side of the opening 8. The trackpad assembly 205 may include the base 203 including resilient members 206, e.g. leaf springs, on which the piezo-electric actuators 205 are bonded, e.g. using adhesive 214, whereby pushing on the ends of the resilient members 206 puts strain on the piezo-electric actuators 205, which translates into a charge, e.g. voltage signal, generated in response to a user input force application, e.g. above a force threshold. The resilient members 206 may be formed by cutting an opening into the base 203. The resilient members 206 may be formed by a pair of openings, e.g. "butterfly" openings, forming two opposed resilient members 206 for each piezo-electric actuator 205, whereby each outer free end of the piezo-electric actuator 205 is mounted on an end of a resilient member 206. Accordingly, a plunger 216 may be mounted on each opposite end of each piezo-electric actuator 205, e.g. with suitable adhesive 217.

Applying voltage to the piezo-electric actuator 205 will bend the resilient member 206 of the base 203, which may lead to the displacement of the top touch surface 52 causing a haptic feedback. The resilient members 206 may be incorporated directly to the base 203 for the purpose of minimizing the thickness of the trackpad assembly 200, but they could be different components without affecting the functionality of the trackpad assembly 200.

Figure 13:
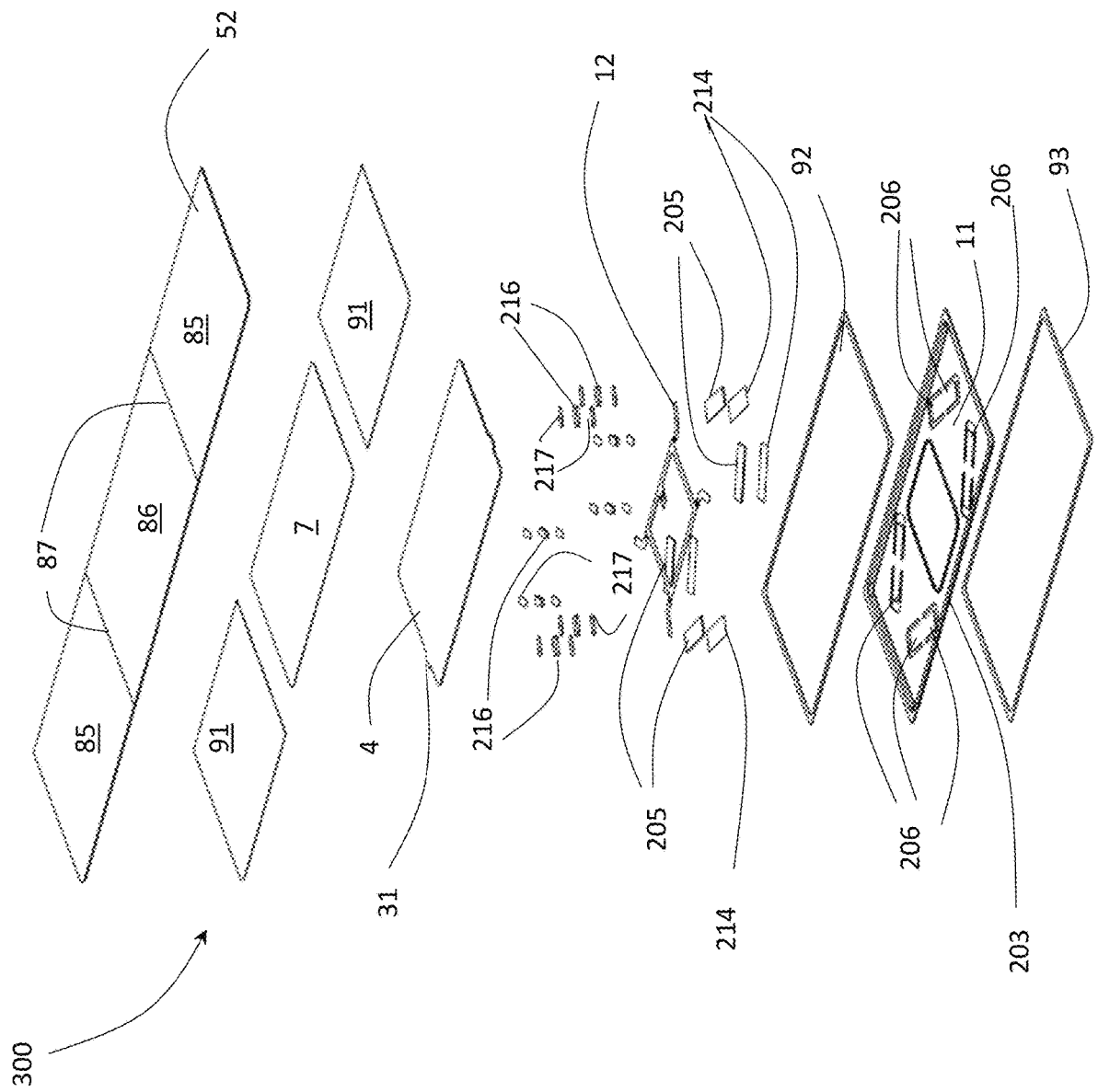
FIG. 13 is an exploded view of a trackpad assembly in accordance with another example.
Figure 14:
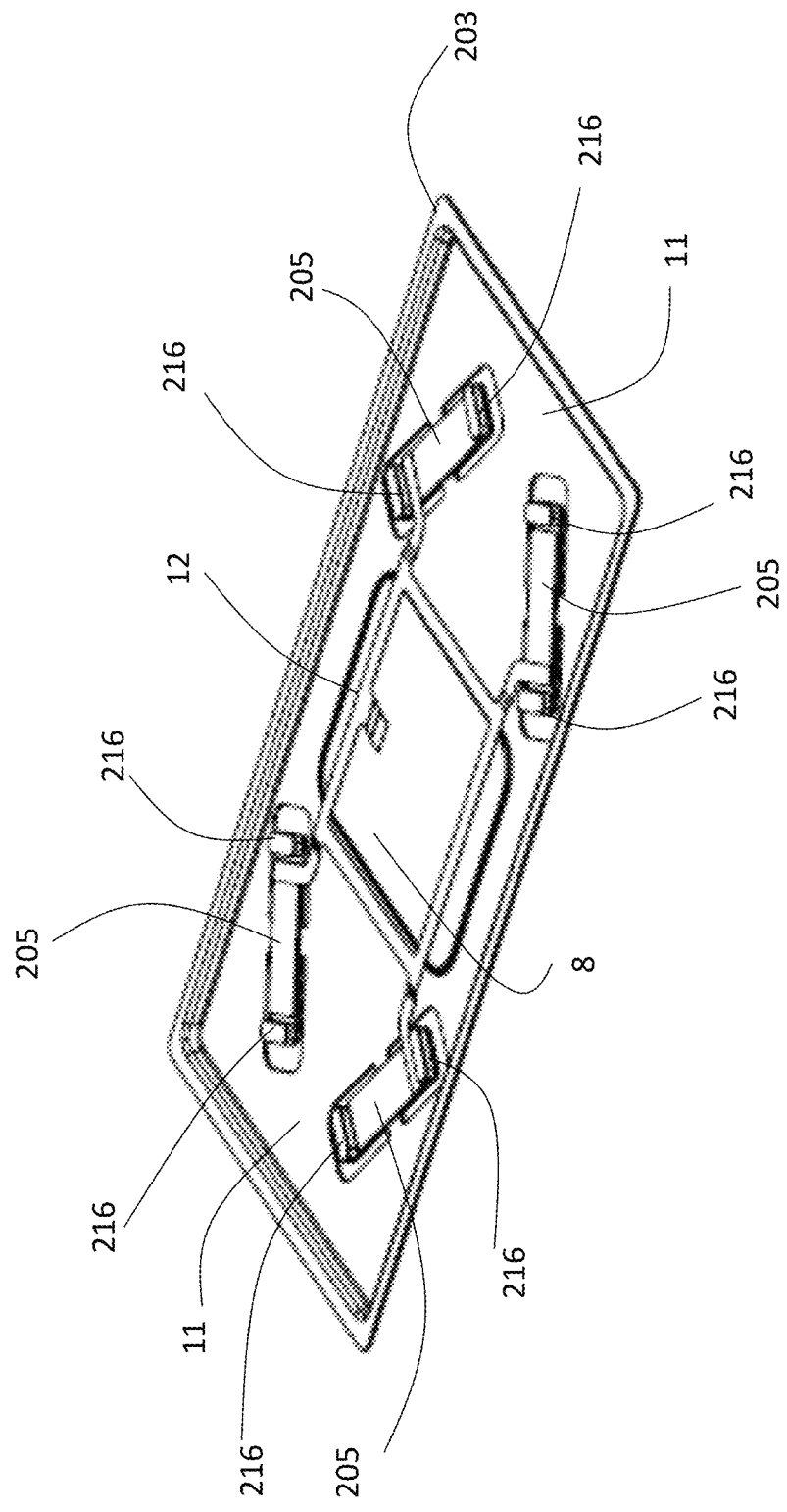
FIG. 14 is an isometric view of a portion of the trackpad assembly in accordance with FIG. 13.

With reference to FIGS. 13 and 14, when it comes to interpolate the position of the user input or to target a region to apply the haptic feedback, it may be more desirable to have more than two piezo-electric actuators 205. Two piezo-electric actuators 205 may divide the top touch surface 52 into two regions or zones, e.g. left and right, but four or more piezo-electric actuators would add the possibility to include a second dimension, e.g. left/right, top/down. The trackpad assembly 300 is very similar to the previous trackpad assembly 200, but uses four piezo-electric actuators instead of two. The piezo-electric actuators 205 may be positioned at any angle relative to each other and the edge of the top touch surface 52, e.g. 0°-90°, preferably 30° to 60°, more preferably about 45°.

Figure 15:
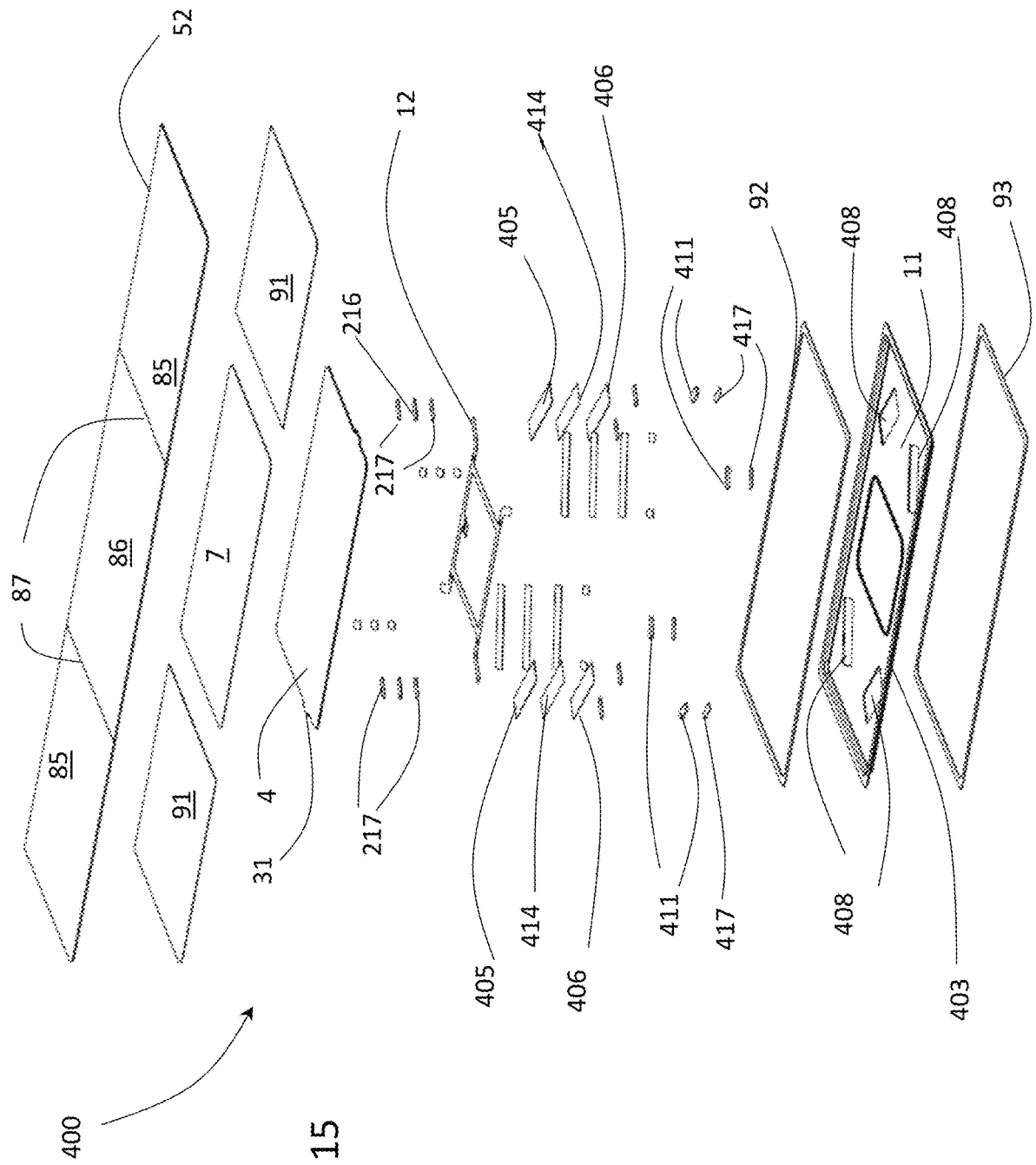
FIG. 15 is an exploded view of a trackpad assembly in accordance with another example.
Figure 16:
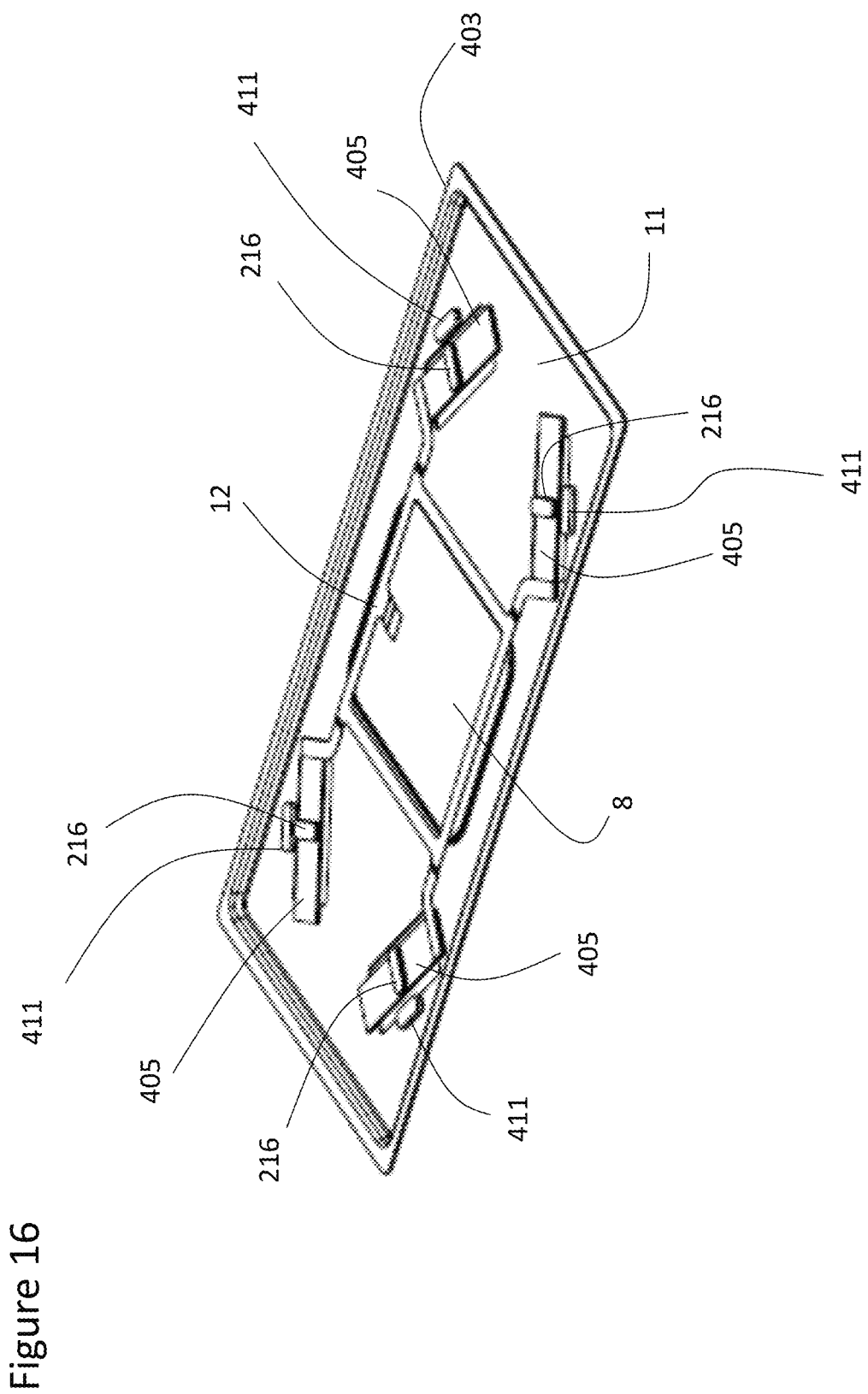
FIG. 16 is an isometric view of a portion of the trackpad assembly in accordance with FIG. 15.

With reference to FIGS. 15 and 16, as mentioned previously, the resilient members do not have to be part of a base 403, e.g. bracket or substrate. A trackpad assembly 400 may include independent, i.e. not part of the base 403, resilient substrates 406 supporting the piezo-electric actuators 405, and connected thereto via adhesive 417. The example shows four piezo-electric actuators 405 with four resilient substrates 406 fixed at one or both ends to the base 403, which may include openings 408 over which the resilient substrates 406 are mounted. More or less piezo-electric actuators 405 mounted parallel or at any angle is within the scope of the example. The resilient substrates 406 may be combined into one more components. The piezo-electric actuators 405 may be located on top and/or on bottom of the resilient substrate 406. Rigid elements 411 (hard stops) may be placed in the corners between the base 403 and the PCB 4 close to the piezo-electric actuators 405 to limit the amount of deflection (and strain by nature of things) that may be transmitted to the piezo-electric actuators 405. There may be a plunger 216 mounted at the center or end of each piezo-electric actuator 405, as hereinbefore disclosed.

Figure 17:
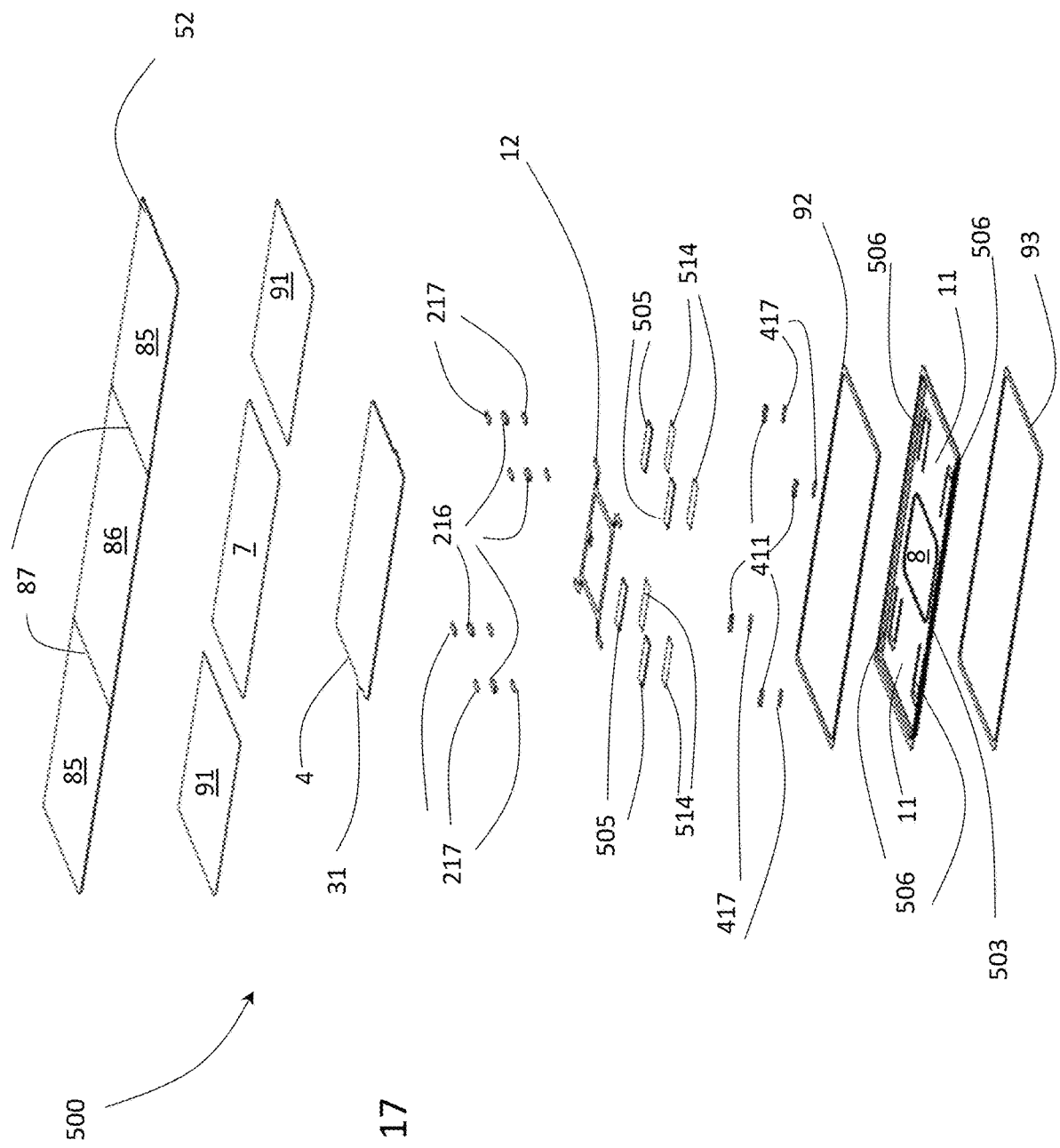
FIG. 17 is an exploded view of a trackpad assembly in accordance with another example.
Figure 18:
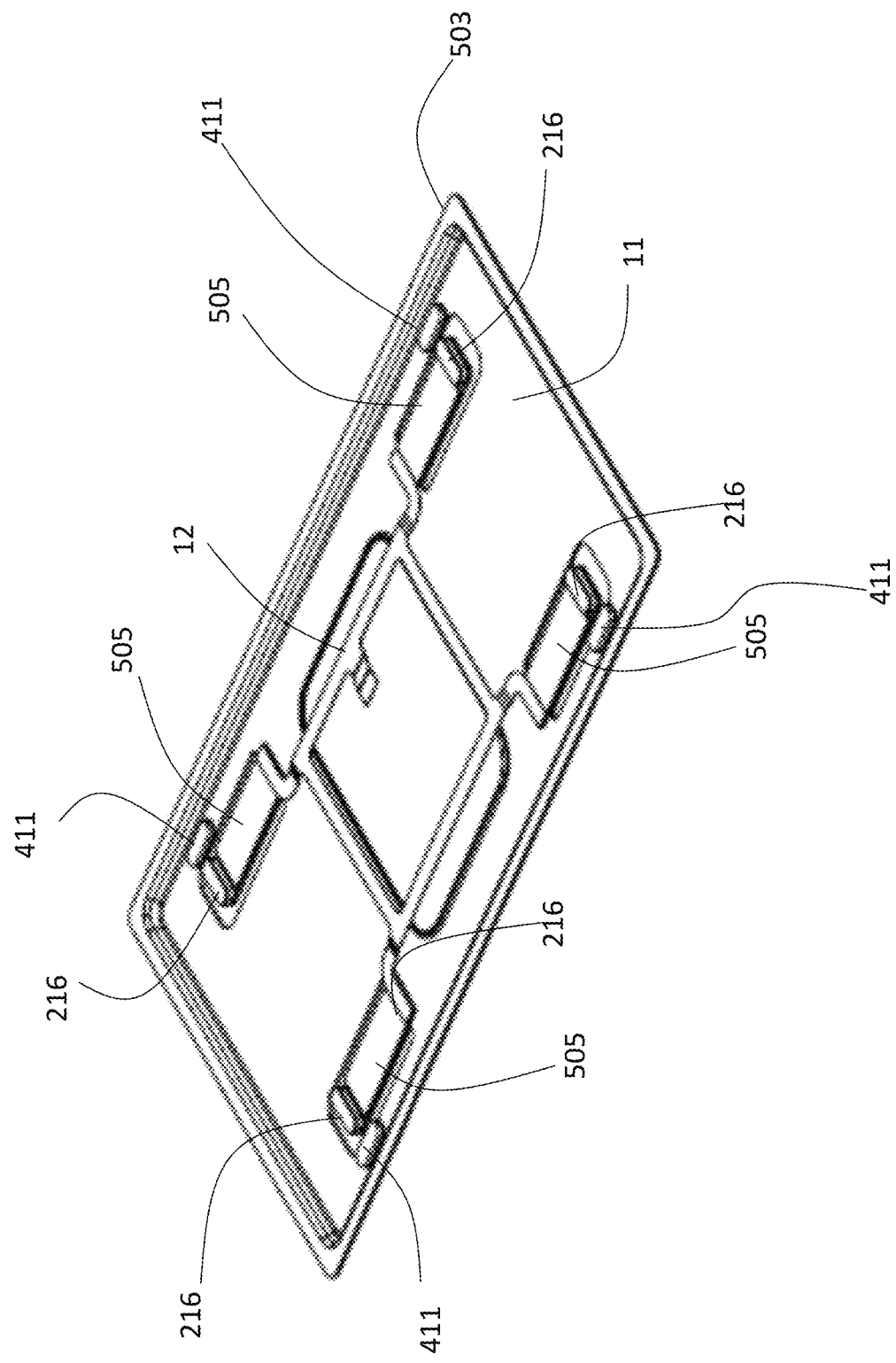
FIG. 18 is an isometric view of a portion of the trackpad assembly in accordance with FIG. 17.

Some previous resilient members were supported at their extremities or circumference for the piezo-electric actuators 5, but it is also possible to use resilient members 506 in a cantilever arm configuration integral with and extending from the base 503, as shown in FIGS. 17 and 18. Again, the resilient members 506 and the piezo-electric actuators 505 may be connected together by adhesive 514 and may be oriented at any angle, e.g. parallel, perpendicular or an acute angle therebetween, relative to each other and the edge of the top touch surface 52, as hereinbefore disclosed. C-shaped or U-shaped openings may be provided in the base 503 to enable the deflection of the resilient members 506, i.e. the cantilever arms, and the piezo-electric elements 505. All other elements with previously introduced reference numerals may perform as hereinbefore described.

Figure 19:
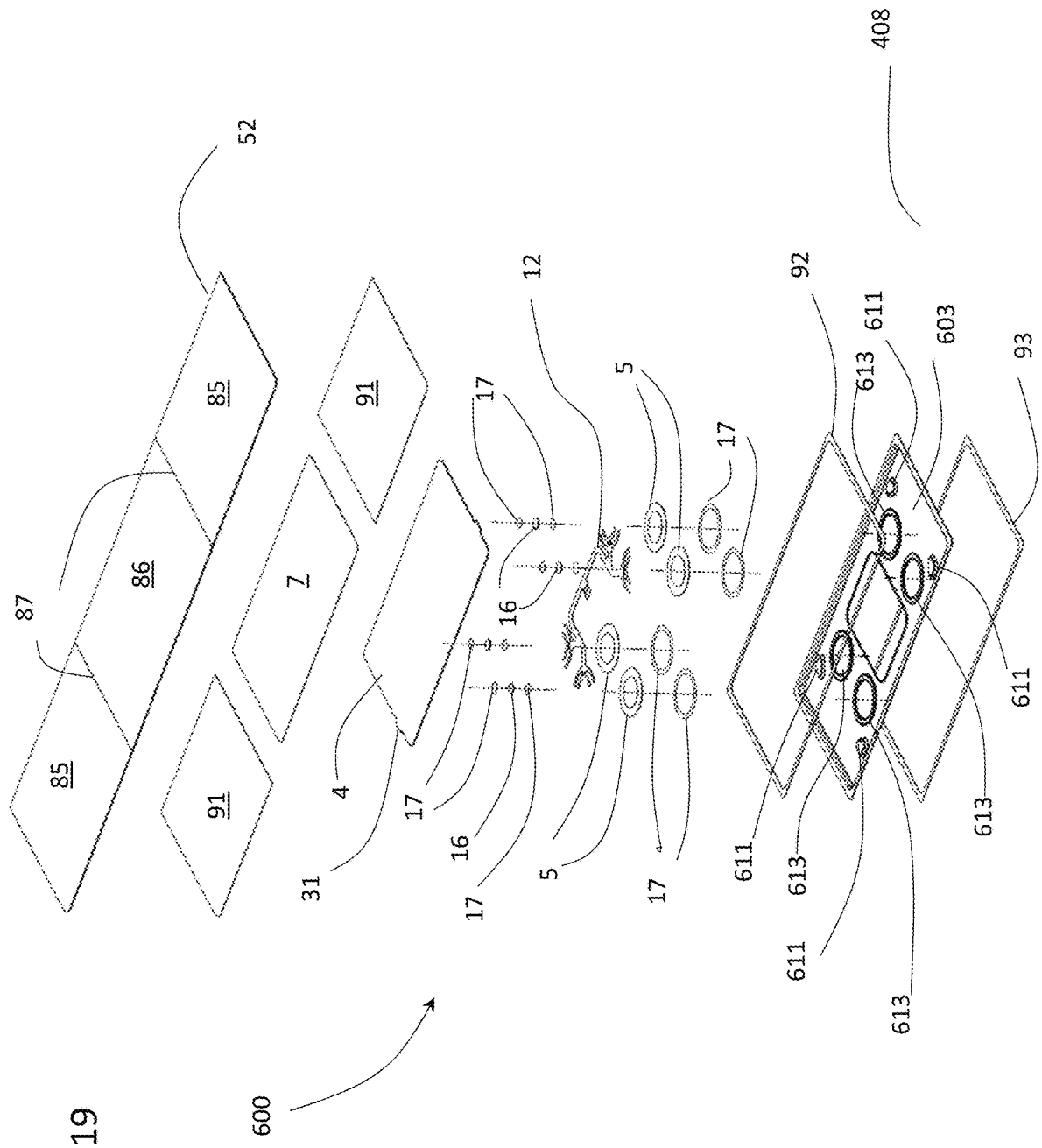
FIG. 19 is an exploded view of a trackpad assembly in accordance with another example.
Figure 20:
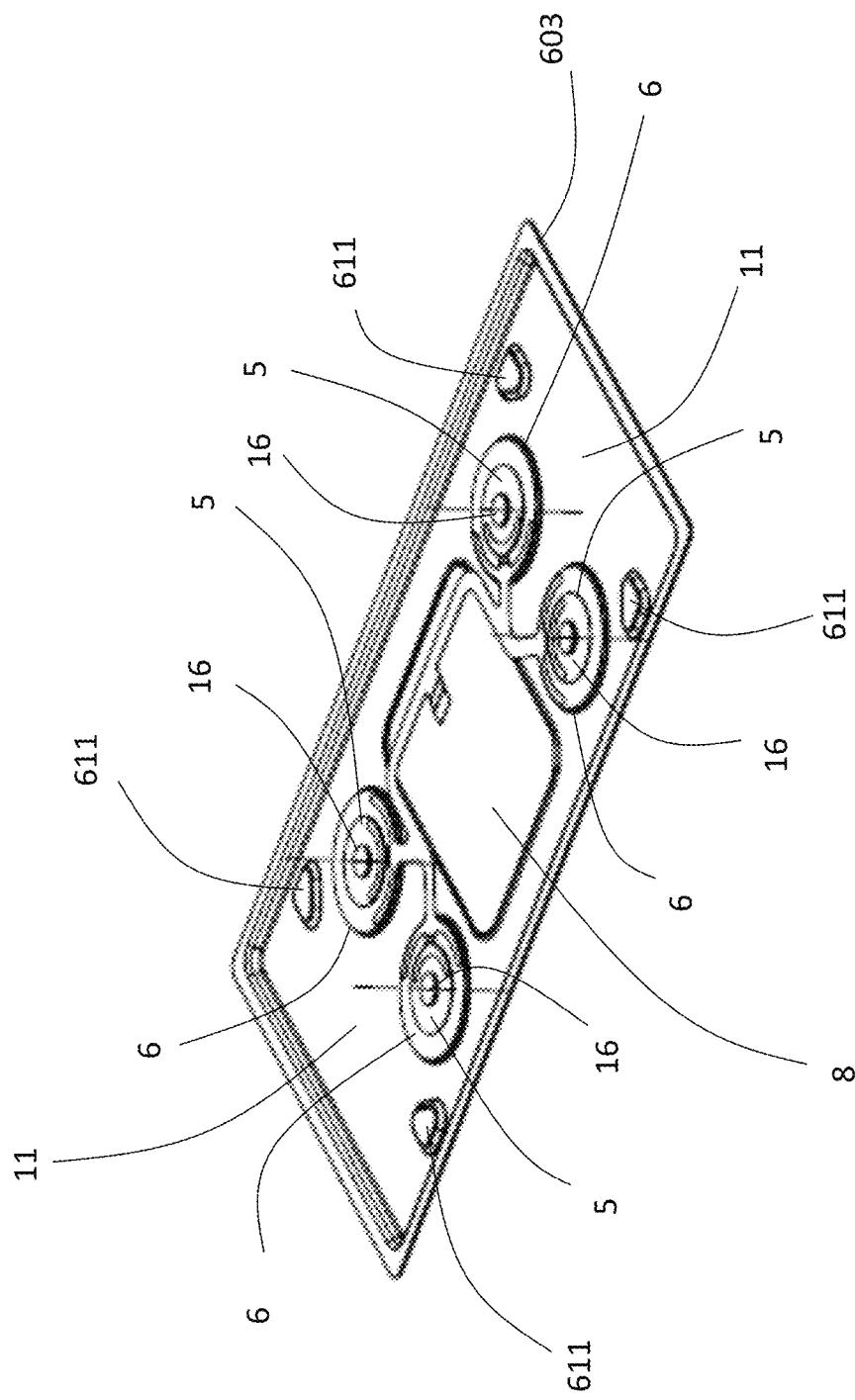
FIG. 20 is an isometric view of a portion of the trackpad assembly in accordance with FIG. 19.

Another example of a trackpad assembly 600 is illustrated in FIGS. 19 and 20, in which functions, such as but not limited to force limiting, e.g. hard stops and shims 13, may be integrated into other components, such as the base 3 or the PCB 4. A base 603 includes integrated raised, e.g. embossed or stamped, annular shims 613 enabling the force to be applied at the circumference of the piezo-electric actuator 5 directly into the base 603. The recessed center of the raised annular shims 613 may act as the hard stop, i.e. when the distance between the recessed center and the top of the raised annular shims 613 is controlled. Hard stops 611 may also be incorporated integral with each base 603 by embossing or stamping at each corner or other suitable location of the base 603. Circular piezo-electric actuators 5 and support members 6 are illustrated, but any other shape or arrangement of piezo-electric actuators and resilient members is within the scope of the example.

Figure 21:
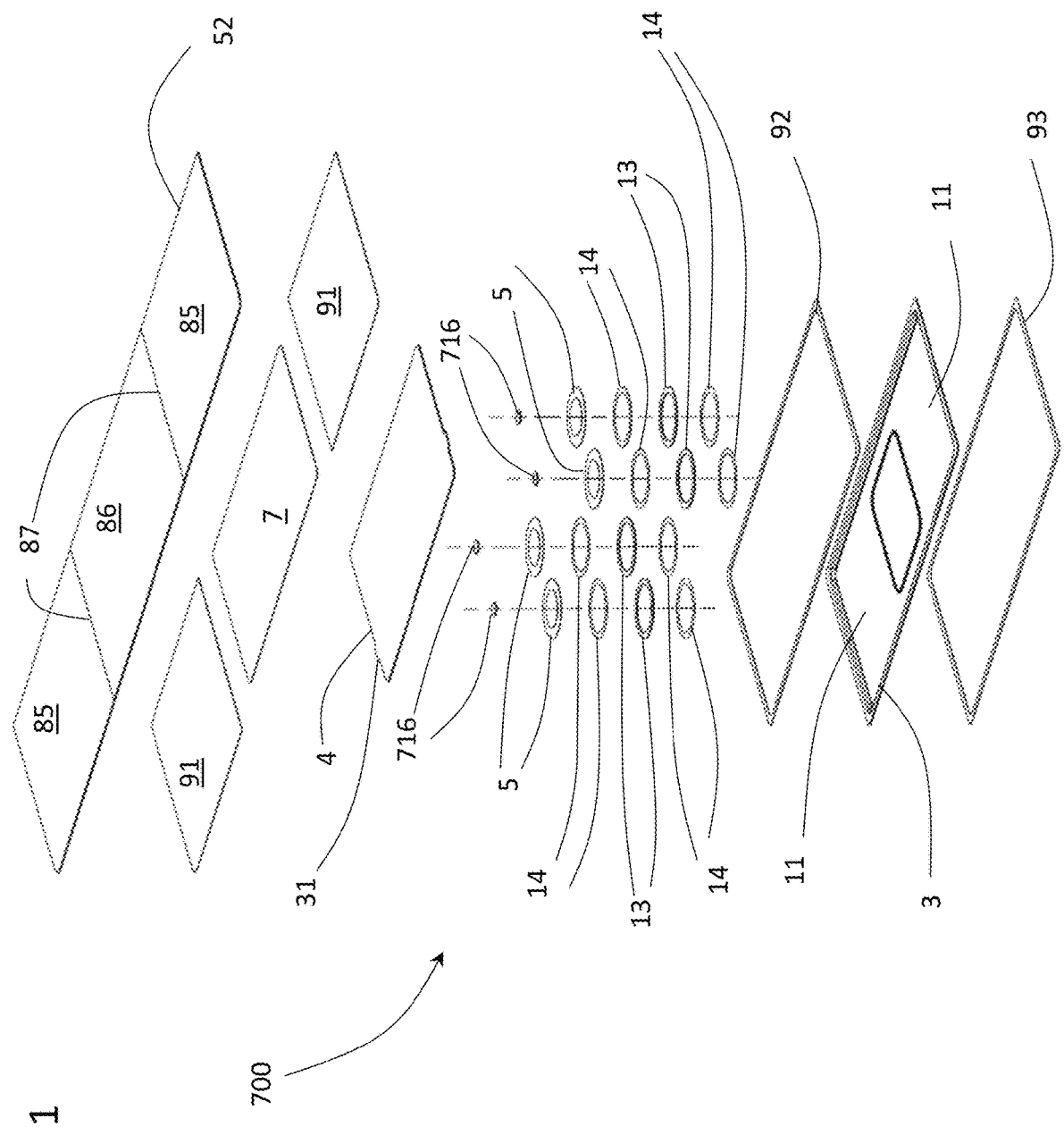
FIG. 21 is an exploded view of a trackpad assembly in accordance with another example.
Figure 22:
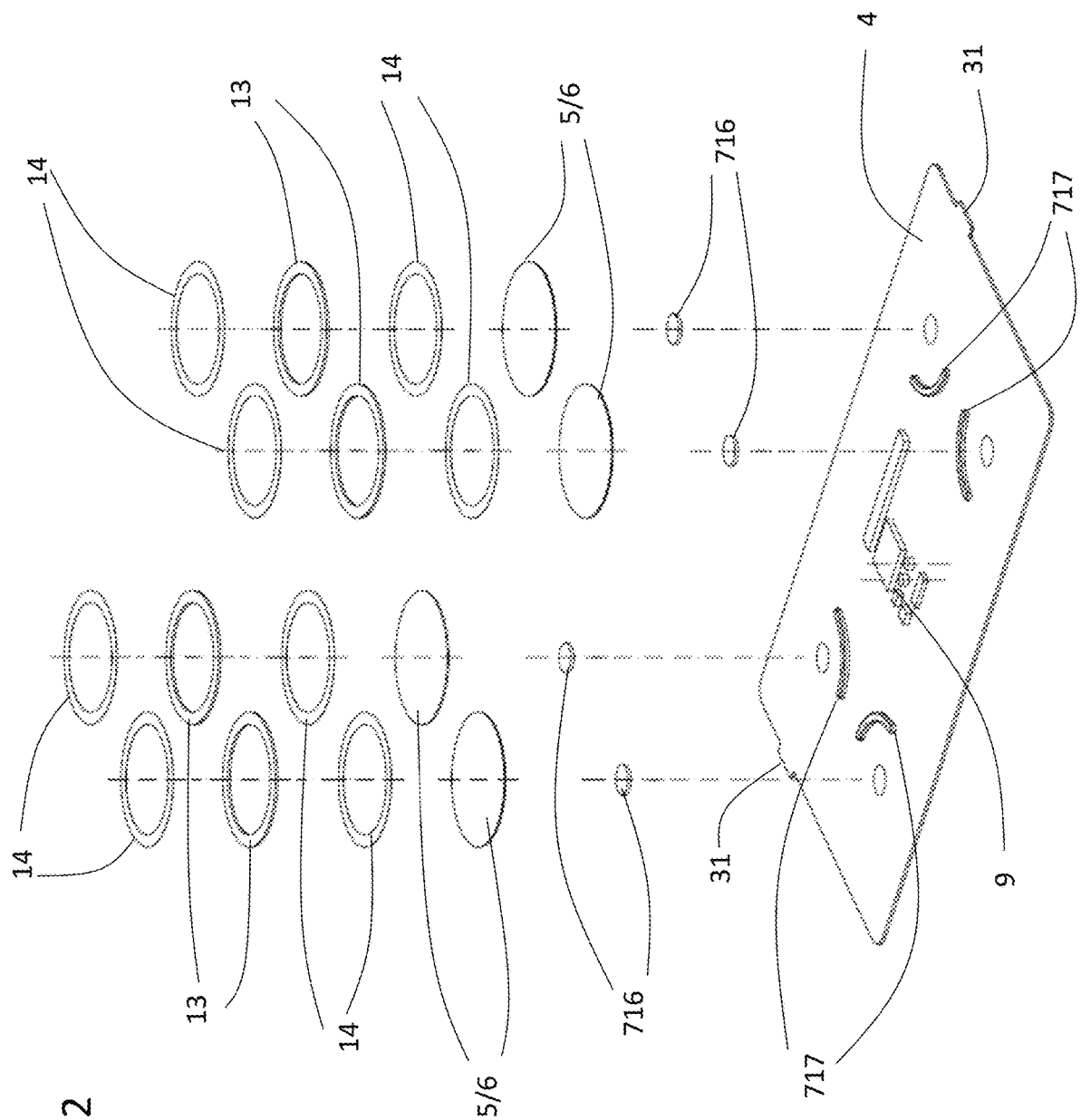
FIG. 22 is an exploded view of a portion of the trackpad assembly in accordance with FIG. 21.
Figure 23:
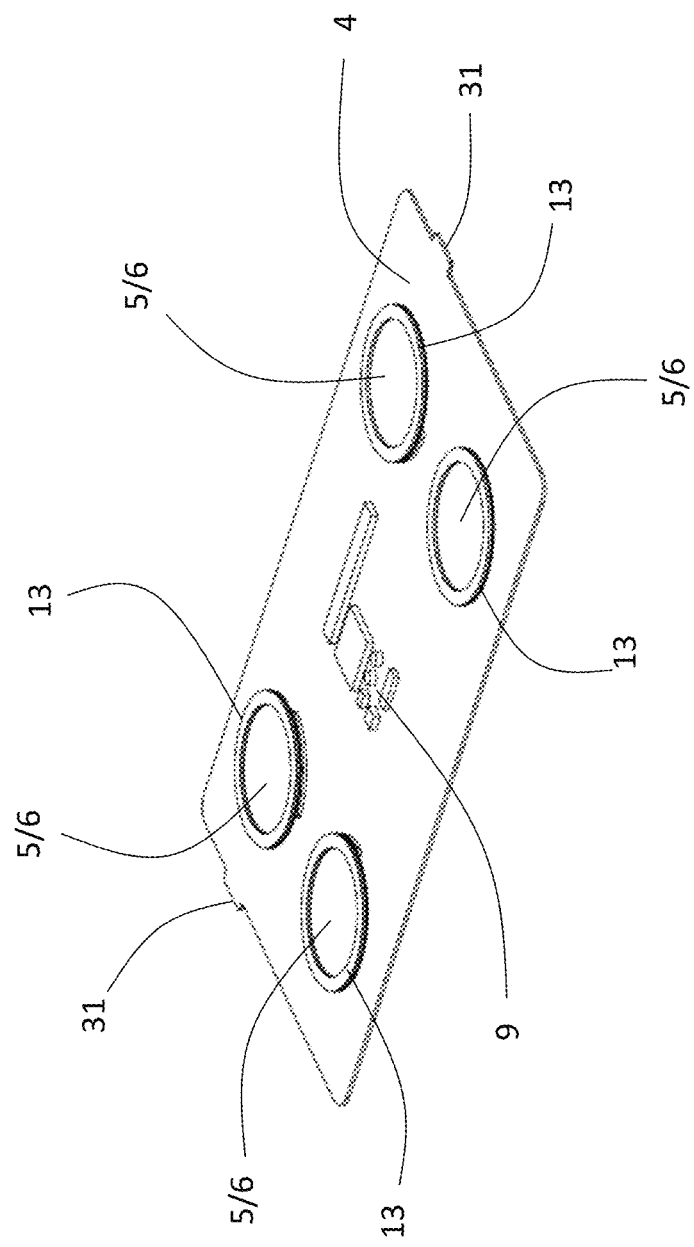
FIG. 23 is an isometric view of the portion of the trackpad assembly in accordance with FIG. 22.
Figure 24:
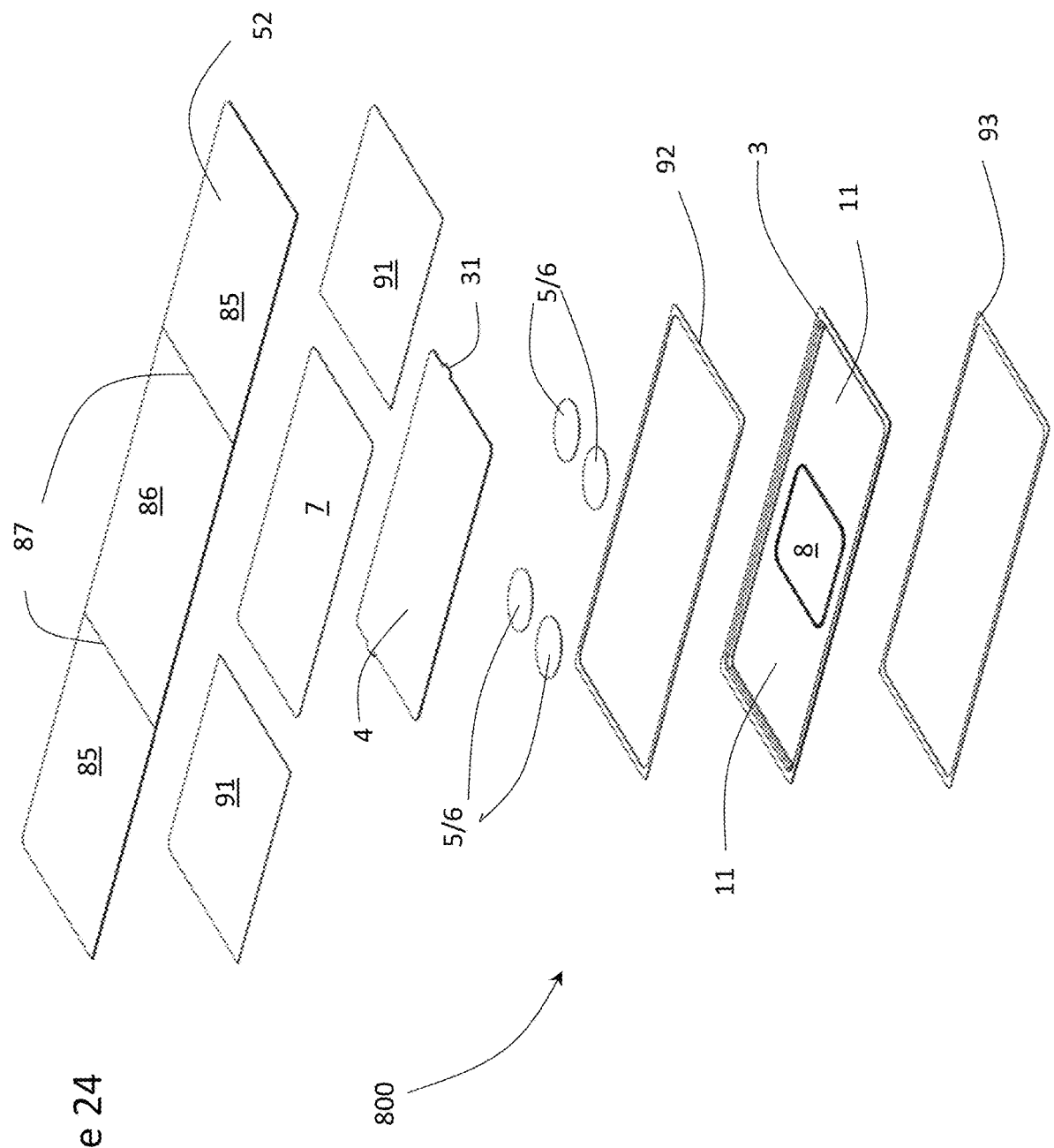
FIG. 24 is an exploded view of a trackpad assembly in accordance with another example.
Figure 25:
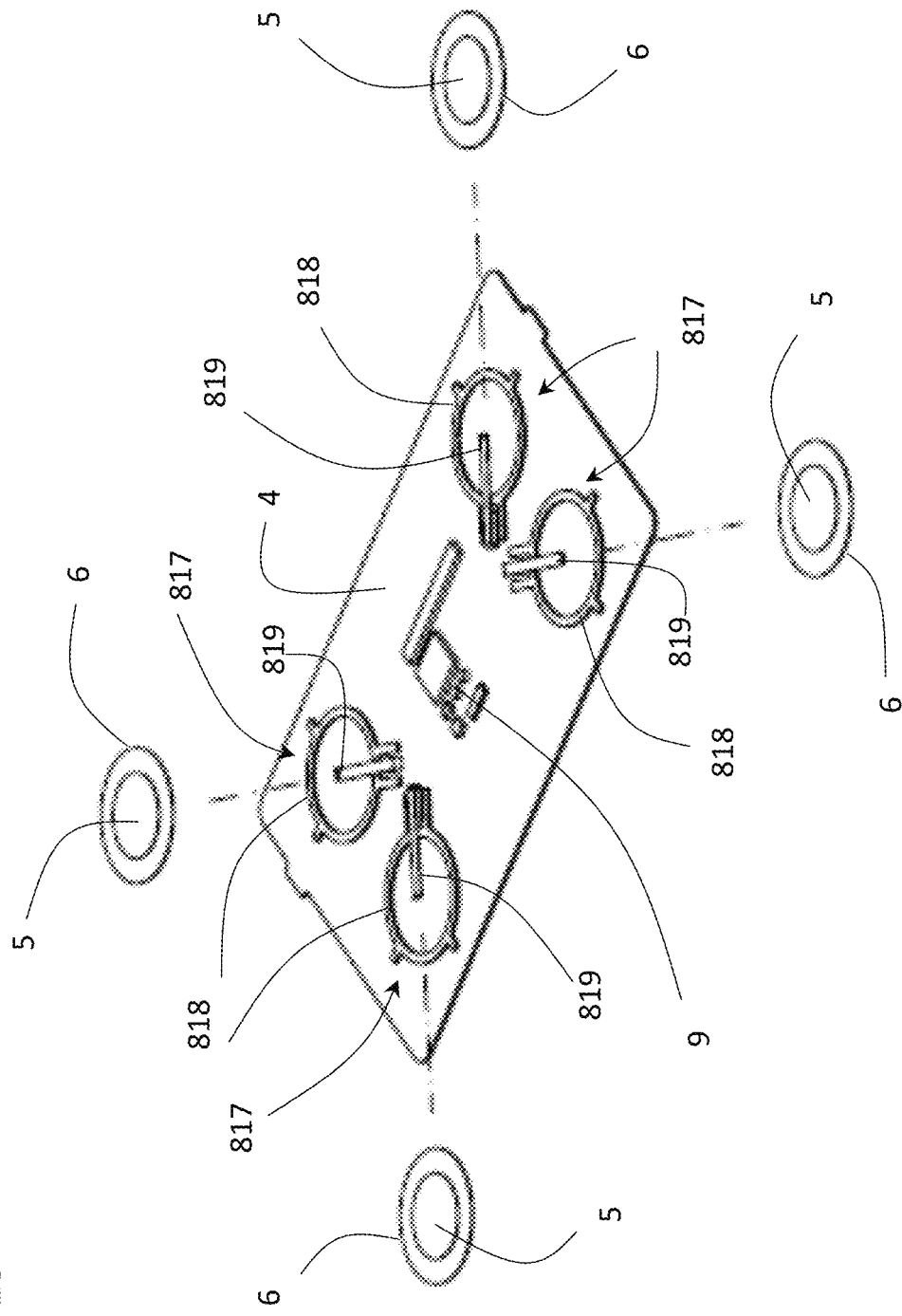
FIG. 25 is an exploded view of a portion of the trackpad assembly in accordance with FIG. 24.
Figure 26:
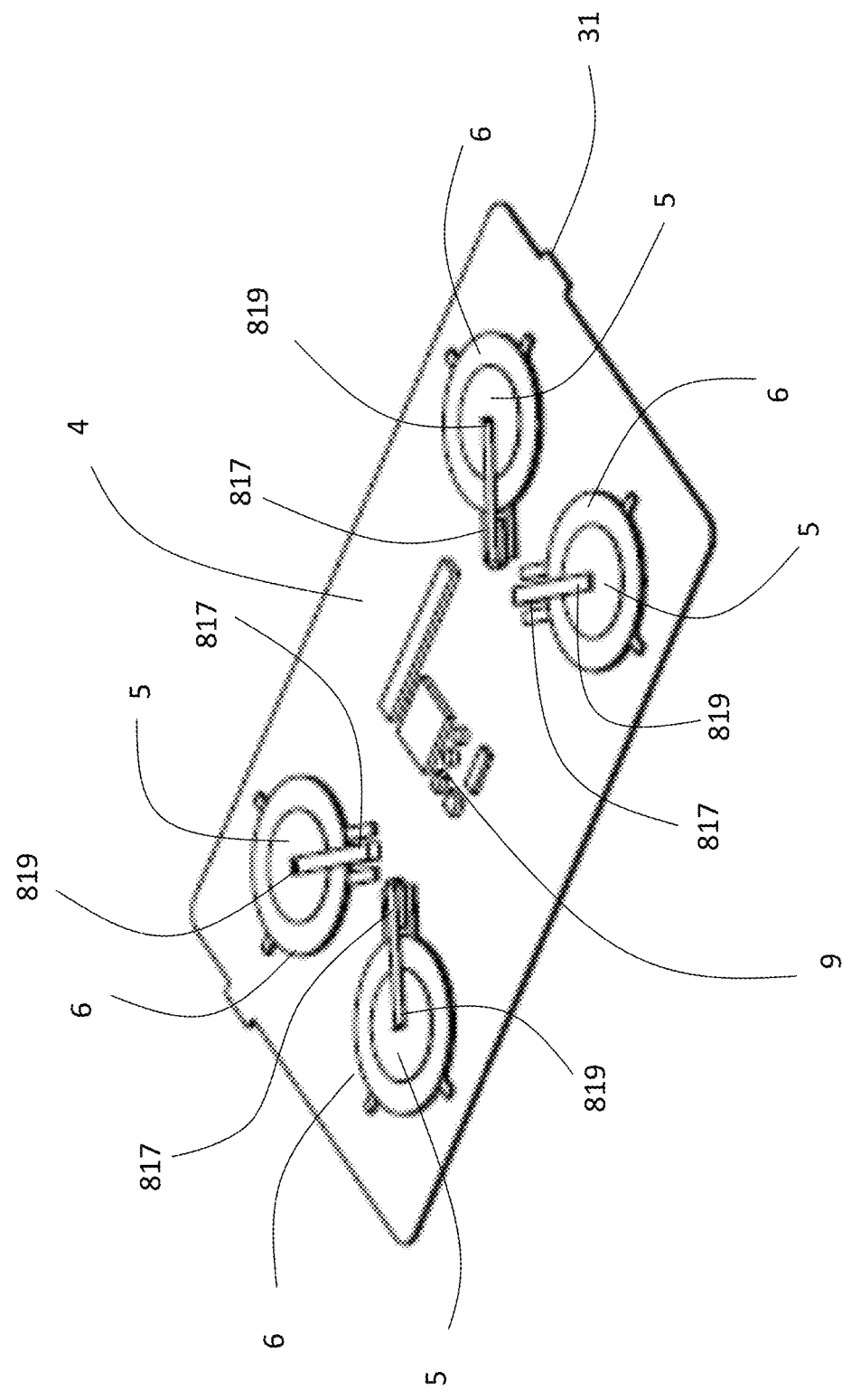
FIG. 26 is an isometric view of the portion of the trackpad assembly in accordance with FIG. 25.

Another example of a trackpad assembly 700 is illustrated in FIGS. 21-23, in which electrical connectors or electrodes from the piezo-electric actuators 5 are in direct contact with the PCB 4, instead of using flexible FPC 12. The electrical connectors or electrodes may be part of the PCB 4 and/or the piezo-electric actuator 5 and/or separate components, e.g. conducting foam tape defining at least a partial perimeter of the piezo-electric actuator 5. The trackpad assembly 700 may include a solid or flexible conductive plunger 716 and a solid or flexible conductive element 717 to connect the PCB 4 to the circumference of the piezo-electric actuator 5. Shims 13 (or embossed shims 613) mounted on the "back" of the piezo-electric actuators 5 may still be present to create the bending stress thereon. A flexible plunger 716 with a rigid conductive element 717 or a solid plunger 716 and a flexible outer ring conduction element 717 is also possible, whereby one of the connection points should allow the deflection of the piezo-electric actuator 5.

Another example of a trackpad assembly 800 is illustrated in FIGS. 24-28, in which, the piezo-electric actuators 5 may be rotate 180° and may be fastened to the PCB 4 via an electrical connector or holder 817 similar to a "Coin battery holder." The holder 817 may be directly attached to the PCB 4, e.g. surface mount soldering. The circumference of the piezo-electric actuator 5 may rests against, e.g. underneath, a ring-shaped electrode 818, the thickness of that electrode 818 acts like a shim for limiting the deformation of the piezo-electric actuator 5, thereby acting as a hard stop. There may be a second electrode 819, e.g. a spring contact, that may also acts as a plunger to concentrate the force to the center of the piezo-electric actuator 5.

Figure 27:
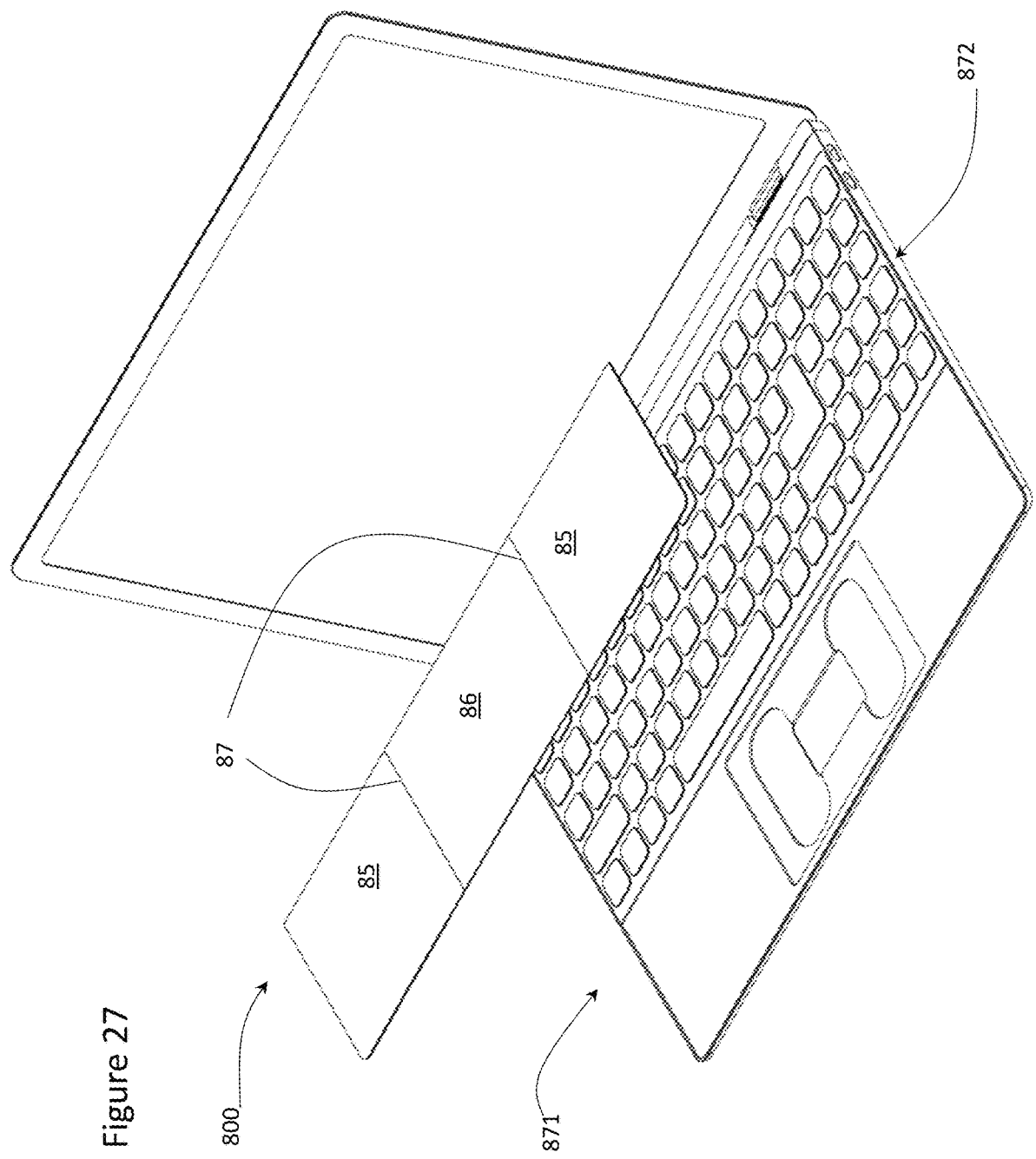
FIG. 27 is a partially exploded view of the trackpad assembly in accordance with FIG. 24 in a laptop computer.
Figure 28:
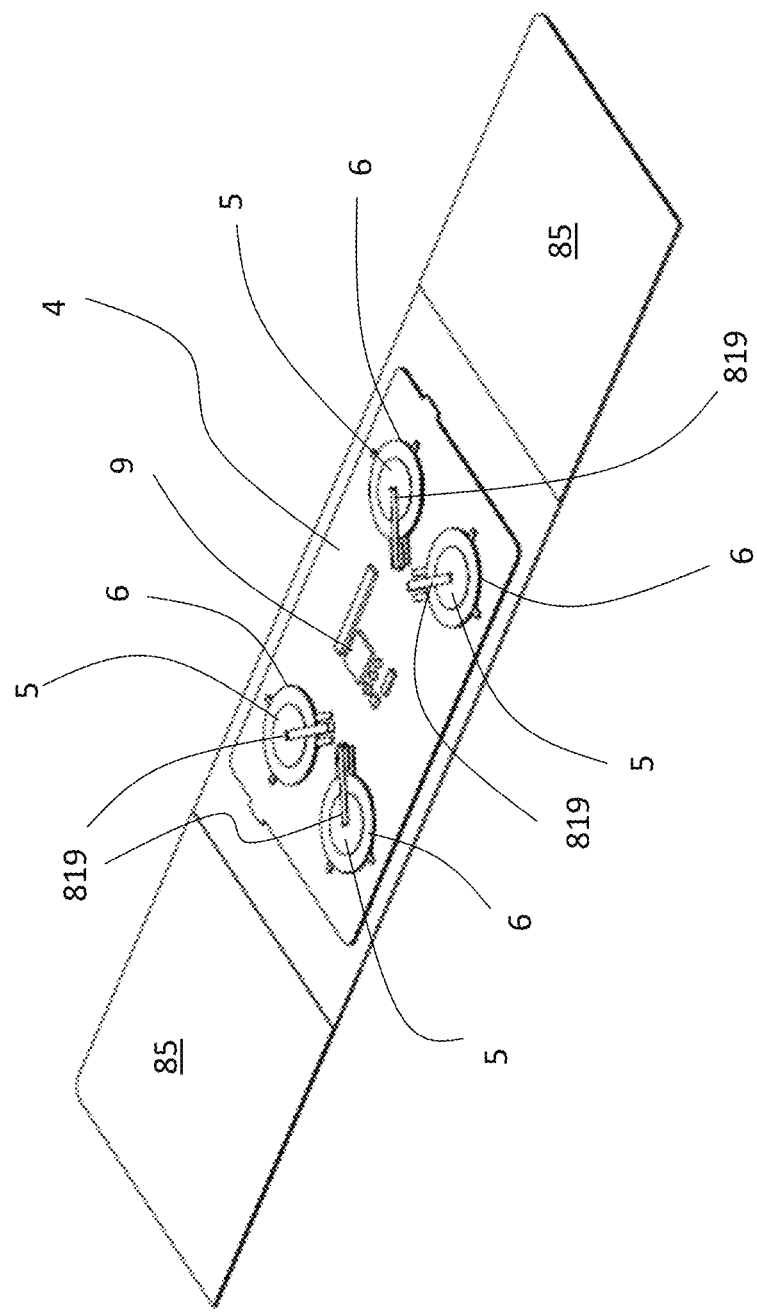
FIG. 28 is an isometric view of the underside of the trackpad assembly in accordance with FIG. 27.

With reference to FIGS. 27 and 28, the trackpad assembly 800 may eliminate quite a few components, but having the piezo-electric actuator 5 directly on the PCB 4, e.g. with conductive elements 717 or 817, may enable the elimination of a separate bracket for the base 3 and the adhesive 93, or other fastening means, used to maintain the base 3 in place. Accordingly, the "plunger 716 or the second electrode 819 mate directly with the upper casing 872 (C Shell) of a laptop computer 871.

Figure 29:
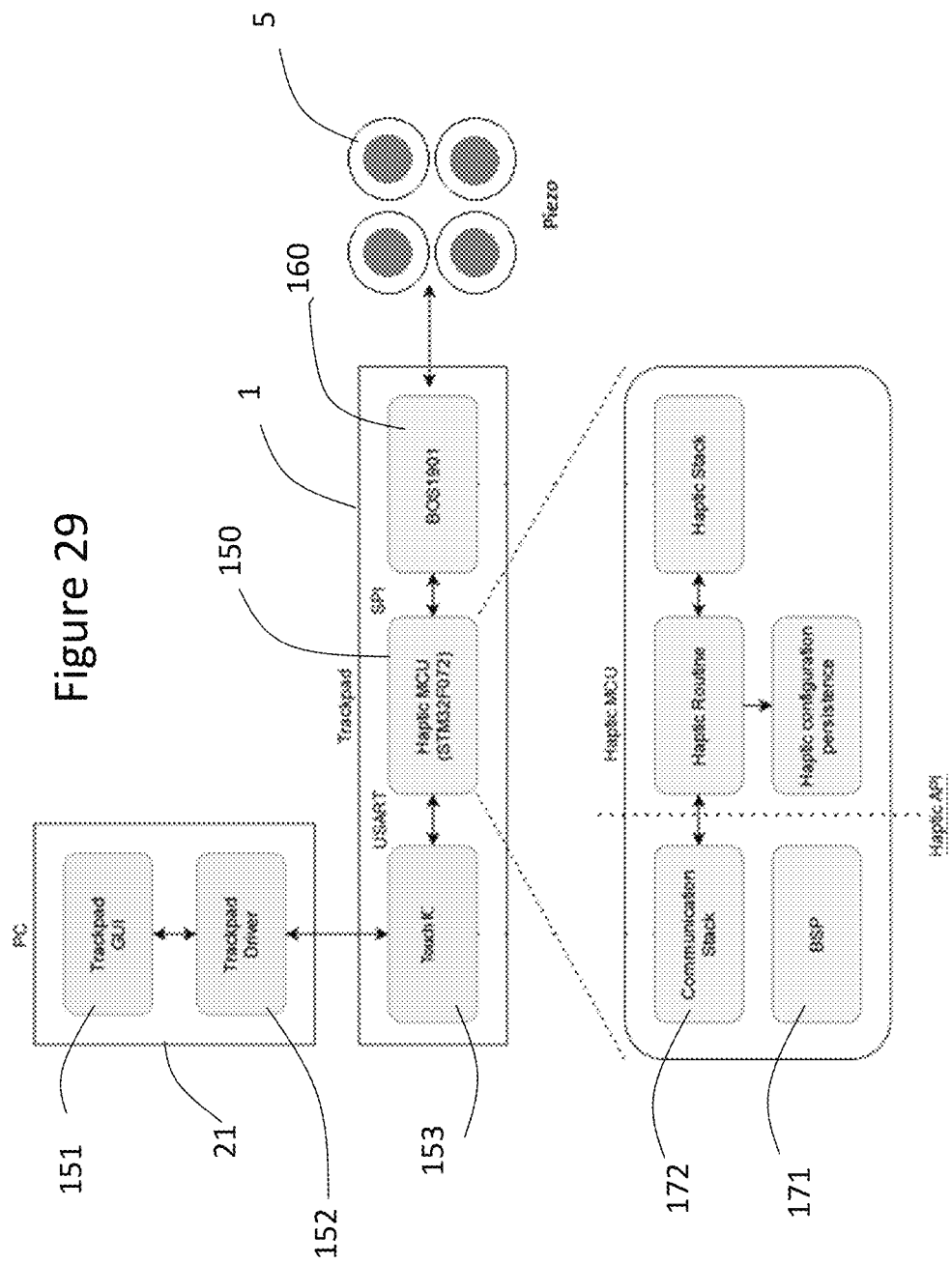
FIG. 29 illustrates a schematic diagram of the trackpad assembly control system.

As illustrated in FIG. 29, the electronics components 9 may comprise a controller processor 150, e.g. microcomputer (MCU), executing computer software instructions stored on a non-transitory memory, the location of the user input on the top touch surface 2 or 52 may be interpolated from the input voltage signals from the plurality of piezo-electric actuators, e.g. 5, 105, 205, 405, etc. and/or derived from capacitive touch sensors found in the trackpad assembly, e.g. 1, 51, 100, 200, 500, 600, 700 or 800, and target a region or zone, e.g. one or more of the piezo-electric actuators, e.g. 5, 105, 205, 405, etc, of the top touch surface 2 or 52 in which to send the haptic response (voltage) signal, thereby isolating the haptic response to a specific piezo-electric actuator and region or zone, while preferably excluding the other piezo-electric actuators and regions or zones. The computer 21 may include a trackpad GUI 151 and a trackpad driver 152 along with a control chip 153 for controlling legacy trackpad systems, such as the capacitive touch sensors. The trackpad assembly, e.g. 1, 51, 100, 200, 500, 600, 700 or 800, may include a driver chip 160 configured for receiving the input electrical signals from the piezo-electric actuators, e.g. 5, 105, 205, 405, etc, and for generating the haptic output electrical signals for the piezo-electric actuators, e.g. 5, 105, 205, 405, etc. Targeted input and response may be possible when a multichannel IC processor driver chip 160, or multiple IC processor driver chips 160 are used.

The controller processor 150 may include a board support package (BSP) 171 and a communication stack providing the application communication interface (API) for communicating with the systems of the computer 21. The computer software instructions and the input map and the output map may also be stored as part of the controller processor 150.

Targeted input and response is especially interesting since trackpads 1, 51, 200 etc. are getting bigger and it is possible that the user's palm touches the trackpad 1, 51, 200 etc. during a haptic event. Conventional trackpad systems could not inhibit the haptic response to the user's palm and focus it on its finger, i.e. the intended location of the user input. Similarly, for two hands use of the trackpad, a single region or zone is triggered so no or little haptic response is felt on the passive hand.

The controller processor 150 may use the precise finger location, e.g. narrowed down to a specific zone, reported by the trackpad touch sensor, e.g. capacitive or piezo-electric actuators, as a means of producing a contextual haptic feedback. Each top touch surface 2 or 52 may be divided into a plurality of zones, each zone corresponding to one or more piezo-electric actuators 5, 105, 205 etc.

Accordingly, the controller processor 150 may locally, e.g. one or more zones, modify the strength of the haptic feedback to one or more piezo-electric actuators 5, 105, 205 etc. to enhance the uniformity of the haptic feedback across the surface of the top touch surface 2 or 52. Moreover, the controller processor 150 may locally produce a different haptic feedback, e.g. higher output voltage signal, to one or more piezo-electric actuators 5, 105, 205 etc. to create virtual buttons, e.g. in the one or more zones, on the top touch surface 2 or 52, whereby each button or zone has a different feel, i.e. haptic response. Similarly, the controller processor 150 may locally produce a different haptic feedback, e.g. higher output voltage signal, to one or more piezo-electric actuators 5, 105, 205 etc. based on the magnitude of the input force of the user, i.e. the larger the input force the larger the haptic response. The controller processor may produce a continuous haptic feedback to a plurality of zones, i.e. piezo-electric actuators 5, 105, 205 etc. to simulate effects, like scrolling or dragging.

Pairs or all of the piezo-electric actuators, e.g. 5, 105, 205, 405, etc., may be connected in parallel to one single-channel IC driver chip 160 or individual driver chips 160, e.g. one driver chip 160 for each piezo-electric actuator or for each zone. Location of the user input may be defined by the "legacy" capacitive touch sensor provided on the trackpad, e.g. between top touch surface 2 or 52 and PCB 4. Accordingly, the processor 150 may then generate and/or utilize an input "map" of sensitivity variability to compensate for the non-uniformity of the system, e.g. pressing in the middle of the top touch surface 2 or 52 does not necessarily yield the same charge (voltage) as pressing in the corner due to the capacitive nature of the piezo-electric actuators 5, 105, 205, 405 etc. A similar output map could be used to modulate the strength of the haptic feedback depending on location of the user's input. The input map and the output map may be saved in the non-transitory memory to be accessed by the controller processor 150 when needed.

Accordingly, when a user pressing in the middle of the trackpad 1, 51, 200 etc. does not yield the same voltage as when pressing in a corner with the same force, e.g. directly over the piezo-electric actuator 5, 105, 205 etc. The controller processor 150 applies the input correction map to the voltage as a function of the location of the user input. The location information may come from the capacitive touch sensor or the piezo-electric actuators 5, 105, 205 etc. Accordingly, the controller processor detects the user input with the same force threshold over the entire top touch surface 2 or 52. The variations in input (touch) and the output (haptic) signals may come from the design, e.g. arrangement of sensors or piezo-electric actuators 5, 105 or 205 etc. or from the variation of the components, e.g. sensors or piezo-electric actuators 5, 105 or 205 etc. used. Accordingly, the input map and the output map may be created at the factory and stored within the non-transitory memory of the electronic components 9, whereby the controller processor 150 may determine an accurate location and amount of input force, and provide a haptic feedback that is uniform throughout the top touch surface 2 or 52, even if there is variation coming from the design or the components.

The foregoing description of one or more example embodiments has been presented for the purposes of illustration and description. It is not intended to be exhaustive or to limit the invention to the precise form disclosed. Many modifications and variations are possible in light of the above teaching. It is intended that the scope of the disclosure be limited not by this detailed description.

We claim:

1. A trackpad system comprising:
   a printed circuit board (PCB) including a plurality of electronic components;
   a top touch surface mounted on a first side of the PCB;
   a plurality of piezo-electric actuators mounted on a second side of the PCB configured to generate electrical signals in response to a force application by a user on the top touch surface, and to provide a haptic response to the user in response to haptic response signals;
   a plurality of shims, at least one of the plurality of shims mounted on each of the plurality of piezo-electric actuators configured to enable deformation of each of the plurality of piezo-electric actuators, wherein all of the plurality of shims comprise a single component; and
   a control circuit configured to receive the electrical signals from the plurality of piezo-electric actuators, and configured to generate the haptic response signals.

2. The trackpad system according to claim 1, wherein the control circuit comprises:
   a controller processor; and
   a non-transitory memory including instructions, which when executed by the controller processor configures the controller processor to:
     determine a location of a user's input on the top touch surface; and
     target a haptic response signal to a selected one or more of the piezo-electric actuators.

3. The trackpad system according to claim 2, wherein the controller processor excludes one or more others of the piezo-electric actuators, based on the location of the user's input.

4. The trackpad system according to claim 2, wherein the controller processor is configured to determine the location of the force application by interpolation based on input voltage signals from the plurality of piezo-electric actuators.

5. The trackpad system according to claim 2, wherein the controller processor is configured to determine a location of the force application based on input signals from capacitive touch sensors.

6. The trackpad system according to claim 2, wherein the controller processor is configured to modify a strength of the haptic response signal to one or more of the plurality of piezo-electric actuators to provide substantial uniformity of the haptic response across the top touch surface.

7. The trackpad system according to claim 6, wherein the controller processor is configured to utilize an input map of sensitivity variability and an output map of sensitivity variability stored in the non-transitory memory to compensate for non-uniformity of the piezo-electric actuators.

8. The trackpad system according to claim 2, wherein the controller processor is configured to produce a different haptic response signal to one or more of the plurality of piezo-electric actuators to provide a difference in haptic feedback across the top touch surface.

9. The trackpad system according to claim 2, wherein the controller processor is configured to produce a different haptic feedback to one or more of the plurality of piezo-electric actuators based on a magnitude of the force application of the user.

10. The trackpad system according to claim 2, wherein each trackpad is divided into a plurality of zones, each zone corresponding to two or more of the plurality of piezo-electric actuators; and wherein the controller processor is configured to produce a continuous haptic feedback to one or more of the plurality of zones to simulate a scrolling or dragging effects.

11. The trackpad system according to claim 1, further comprising a plurality of resilient members, one of the plurality of resilient members mounted on each one of the plurality of piezo-electric actuators, configured to enable the plurality of piezo-electric actuators to deform during the force application by the user or a haptic response to the user.

12. The trackpad system according to claim 11, wherein each one of the plurality of piezo-electric actuators has a quadrilateral shape; and wherein each one of the plurality of resilient members comprises a cantilevered arm.

13. The trackpad system according to claim 12, wherein each one of the plurality of resilient members comprises a pair of cantilevered arms, outer free ends of each of the pair of cantilevered arms connected to ends of a respective one of the plurality of piezo-electric actuators.

14. The trackpad system according to claim 12, wherein each one of the plurality of piezo-electric actuators is at an acute angle to an edge of the top touch surface.

15. The trackpad system according to claim 12, further comprising a base configured to support the plurality of piezo-electric actuators; wherein each cantilevered arm is integral with the base.

16. The trackpad system according to claim 11, wherein each one of the plurality of piezo-electric actuators comprises a circular disk; and wherein each one of the plurality of resilient members comprises a circular substrate with a diameter larger than the circular disk.

17. The trackpad system according to claim 1, further comprising a base configured to support the plurality of piezo-electric actuators mounted on each respective shim, whereby the base is configured to form a hard stop for the deformation of each of the plurality of piezo-electric actuators.

18. The trackpad system according to claim 17, wherein each respective shim is integral with the base.

19. The trackpad system according to claim 1, wherein each respective shim comprises adhesive defining at least a partial perimeter of a corresponding one of the plurality of piezo-electric actuators.

20. The trackpad system according to claim 1, wherein each respective shim comprises an electrical connector mounted on the PCB configured to electrical connect each the plurality of piezo-electric actuators to the PCB.

21. The trackpad system according to claim 1, wherein each one of the plurality of piezo-electric actuators comprises a pair of superposed circular disks; and wherein each respective shim is mounted between each pair of superposed circular disks.

\* \* \* \* \*